United States Patent
Kumar et al.

(10) Patent No.: US 10,270,908 B2
(45) Date of Patent: *Apr. 23, 2019

(54) VISUAL INTERACTIVE VOICE RESPONSE SYSTEM

(71) Applicant: Genesys Telecommunications Laboratories, Inc., Daly City, CA (US)

(72) Inventors: Praphul Kumar, Falls Church, VA (US); Scott Kolman, San Jose, CA (US); Andrea Friio, Layfayette, CA (US); Yochai Konig, San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/289,932

(22) Filed: Oct. 10, 2016

(65) Prior Publication Data

US 2017/0118337 A1   Apr. 27, 2017

Related U.S. Application Data

(63) Continuation of application No. 14/683,894, filed on Apr. 10, 2015, now Pat. No. 9,467,563.

(51) Int. Cl.
*H04M 3/493* (2006.01)
*H04L 29/06* (2006.01)

(52) U.S. Cl.
CPC ...... *H04M 3/4938* (2013.01); *H04L 65/1063* (2013.01); *H04M 2203/253* (2013.01)

(58) Field of Classification Search
CPC .................................................. H04M 3/493
USPC ............... 379/88.01–88.04, 265.02; 704/270
See application file for complete search history.

(56) References Cited

U.S. PATENT DOCUMENTS

| | | |
|---|---|---|
| 6,263,051 B1 | 7/2001 | Saylor et al. |
| 6,587,547 B1 | 7/2003 | Zirngibl et al. |
| 6,606,596 B1 | 8/2003 | Zirngibl et al. |
| 6,658,093 B1 | 12/2003 | Langseth et al. |

(Continued)

FOREIGN PATENT DOCUMENTS

KR   1020090007193 A   1/2009

OTHER PUBLICATIONS

International Search Report and Written Opinion for International Application No. PCT/US2014/056452, dated Dec. 29, 2014, 14 pages.

(Continued)

*Primary Examiner* — Md S Elahee

(57) ABSTRACT

A request is received from a communications device to execute an interaction site. A request is transmitted to the automated response system. First instructions that provide one or more steps of the multi-step communication flow between the communications device and the automated response system are received from the automated response system. In response to determining that the request is for the voice-interaction with the interaction site, second instructions that provide the one or more steps through a voice interaction with a user of the communications device are determined and transmitted to the communications device. In response to determining that the request is for the visual-interaction with the interaction site, third instructions that provide the one or more steps through a visual interaction with the user of the communications device are determined and transmitted to the communications device.

20 Claims, 22 Drawing Sheets

(56) References Cited

U.S. PATENT DOCUMENTS

| | | | |
|---|---|---|---|
| 6,765,997 B1 | 7/2004 | Zirngibl et al. | |
| 6,768,788 B1 | 7/2004 | Langseth et al. | |
| 6,788,768 B1 | 9/2004 | Saylor et al. | |
| 6,798,867 B1 | 9/2004 | Zirngibl et al. | |
| 6,829,334 B1 | 12/2004 | Zirngibl et al. | |
| 6,836,537 B1 | 12/2004 | Zirngibl et al. | |
| 6,850,603 B1 | 2/2005 | Eberle et al. | |
| 6,873,693 B1 | 3/2005 | Langseth et al. | |
| 6,885,734 B1 | 4/2005 | Eberle et al. | |
| 6,895,084 B1 | 5/2005 | Saylor et al. | |
| 6,920,425 B1 | 7/2005 | Will et al. | |
| 6,940,953 B1 | 9/2005 | Eberle et al. | |
| 6,964,012 B1 | 11/2005 | Zirngibl et al. | |
| 6,977,992 B2 | 12/2005 | Zirngibl et al. | |
| 7,020,251 B2 | 3/2006 | Zirngibl et al. | |
| 7,082,422 B1 | 7/2006 | Zirngibl et al. | |
| 7,197,461 B1 | 3/2007 | Eberle et al. | |
| 7,266,181 B1 | 9/2007 | Zirngibl et al. | |
| 7,272,212 B2 | 9/2007 | Eberle et al. | |
| 7,296,226 B2 | 11/2007 | Junkermann | |
| 7,340,040 B1 | 3/2008 | Saylor et al. | |
| 7,428,302 B2 | 9/2008 | Zirngibl et al. | |
| 7,440,898 B1 | 10/2008 | Eberle et al. | |
| 7,457,397 B1 | 11/2008 | Saylor et al. | |
| 7,486,780 B2 | 2/2009 | Zirngibl et al. | |
| 7,792,254 B2 | 9/2010 | Anisimov et al. | |
| 7,831,693 B2 | 11/2010 | Lai | |
| 7,996,251 B2 | 8/2011 | Kannan et al. | |
| 8,018,921 B2 | 9/2011 | Pogossiants et al. | |
| 8,041,575 B2 | 10/2011 | Agarwal et al. | |
| 8,117,538 B2 | 2/2012 | Anisimov et al. | |
| 8,200,527 B1 | 6/2012 | Thompson et al. | |
| 8,654,934 B2 | 2/2014 | Saylor et al. | |
| 9,148,512 B1* | 9/2015 | Kumar | H04M 3/5232 |
| 9,467,563 B1 | 10/2016 | Kumar et al. | |
| 2003/0007625 A1 | 1/2003 | Pines et al. | |
| 2003/0144843 A1 | 7/2003 | Belrose | |
| 2004/0110487 A1 | 6/2004 | Creamer et al. | |
| 2004/0117804 A1 | 6/2004 | Scahill et al. | |
| 2005/0055321 A1 | 3/2005 | Fratkina et al. | |
| 2005/0141679 A1 | 6/2005 | Zirngibl et al. | |
| 2005/0207545 A1 | 9/2005 | Gao et al. | |
| 2005/0273759 A1 | 12/2005 | Lucassen et al. | |
| 2007/0233495 A1* | 10/2007 | Agapi | 704/270 |
| 2007/0250841 A1 | 10/2007 | Scahill et al. | |
| 2007/0286162 A1 | 12/2007 | Fabbrizio et al. | |
| 2008/0065390 A1 | 3/2008 | Ativanichayaphong et al. | |
| 2008/0162628 A1 | 7/2008 | Hill et al. | |
| 2008/0319760 A1 | 12/2008 | Da Palma et al. | |
| 2009/0138269 A1 | 5/2009 | Agarwal et al. | |
| 2009/0204603 A1 | 8/2009 | Martino et al. | |
| 2011/0151838 A1 | 6/2011 | Olincy et al. | |
| 2011/0196979 A1 | 8/2011 | Maes | |
| 2011/0211679 A1 | 9/2011 | Mezhibovsky et al. | |
| 2011/0219080 A1 | 9/2011 | McWithey et al. | |
| 2011/0286586 A1 | 11/2011 | Saylor et al. | |
| 2011/0293078 A1 | 12/2011 | Saylor et al. | |
| 2013/0022181 A1 | 1/2013 | Or-Bach et al. | |
| 2014/0037075 A1* | 2/2014 | Bouzid | H04M 3/42153 |
| | | | 379/88.03 |
| 2014/0244253 A1 | 8/2014 | Bringert et al. | |
| 2015/0256677 A1 | 9/2015 | Konig et al. | |
| 2015/0350428 A1* | 12/2015 | Glass | H04M 3/493 |
| | | | 379/88.01 |
| 2016/0301802 A1 | 10/2016 | Kumar et al. | |

OTHER PUBLICATIONS

International Search Report and Written Opinion of the International Searching Authority for Application No. PCT/US2011/033505, dated Aug. 2, 2011, 11 pages.

PCT Notification Concerning Transmittal of International Preliminary Report on Patentability for Application No. PCT/US2011/033505, dated Oct. 23, 2012, 11 pages.

U.S. Non-Final Office Action for U.S. Appl. No. 14/058,661 dated Sep. 4, 2014, 13 pages.

U.S. Non-Final Office Action for U.S. Appl. No. 13/092,090, dated May 9, 2013, 12 pages.

U.S. Non-Final Office Action for U.S. Appl. No. 13/092,101, dated Mar. 11, 2013, 12 pages.

U.S. Notice of Allowance for U.S. Appl. No. 13/092,090, dated Oct. 9, 2013, 13 pages.

U.S. Notice of Allowance for U.S. Appl. No. 13/092,101, dated Jul. 12, 2013, 11 pages.

U.S. Notice of Allowance for U.S. Appl. No. 14/032,443 dated Jul. 22, 2014, 13 pages.

U.S. Notice of Allowance for U.S. Appl. No. 14/170,722 dated Oct. 27, 2014, 19 pages.

International Search Report and Written Opinion for International Application No. PCT/US2016/026814, dated Jun. 30, 2016, 13 pages.

Australian Government IP Australia Examination Report No. 1 for Application No. 2016246072, dated May 1, 2018, 3 pages.

Extended European Search Report for Application No. 16777439.7, dated Apr. 5, 2018, 9 pages.

Canadian Office Action for Application No. 2,992,249, dated Nov. 9, 2018, 4 pages.

* cited by examiner

Figure 4A:
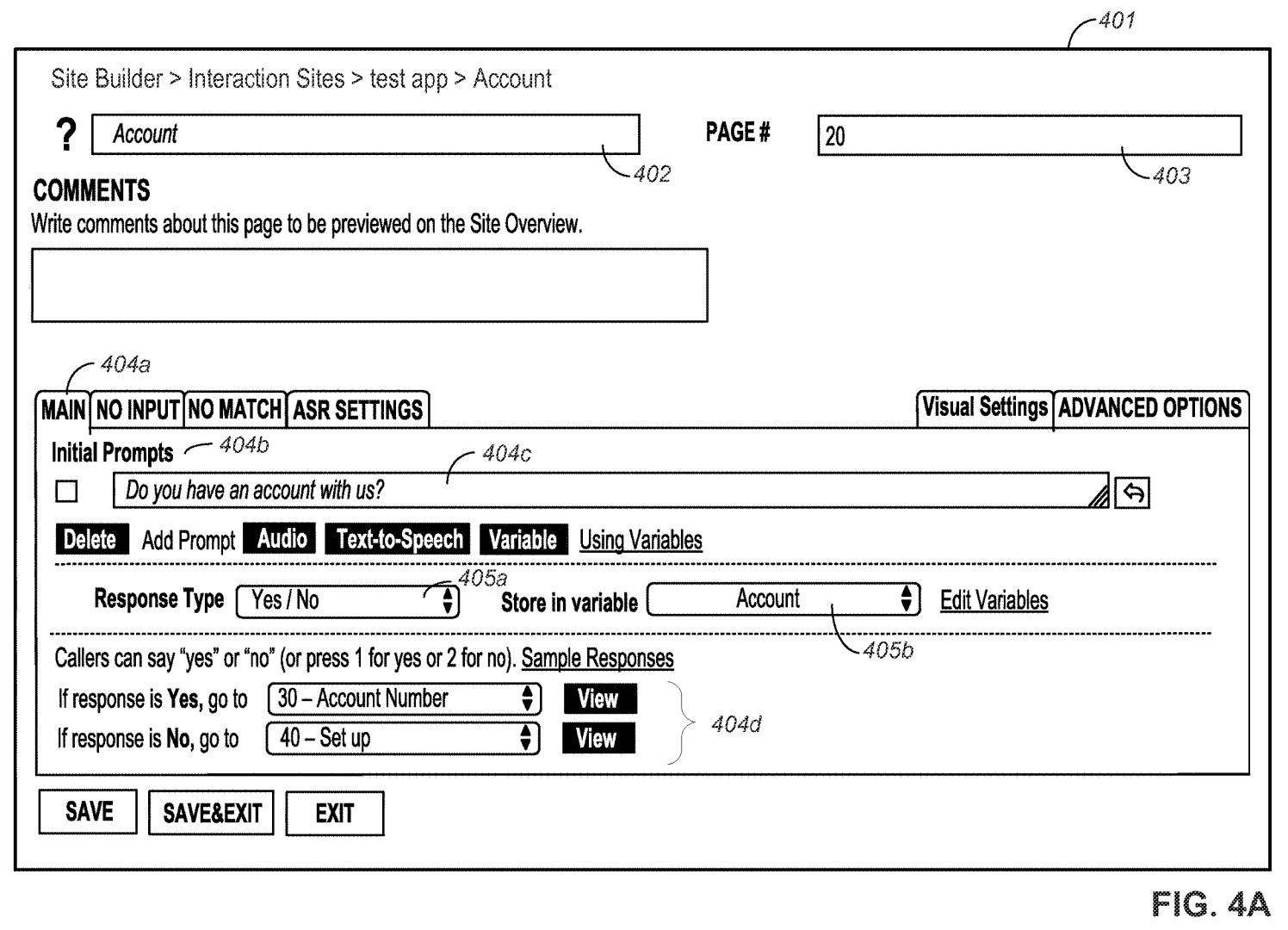

Site Builder > Interaction Sites > test app > Account

? Account — 402

PAGE # [ 20 ] — 403

COMMENTS
Write comments about this page to be previewed on the Site Overview.

401

| MAIN | NO INPUT | NO MATCH | ASR SETTINGS | | Visual Settings | ADVANCED OPTIONS |

404a

Initial Prompts — 404b

☐ Do you have an account with us?

Delete   Add Prompt   Audio   Text-to-Speech   Variable   Using Variables — 404c 405a Response Type [ Yes / No ▼ ]   Store in variable [ Account ▼ ]   Edit Variables 405b Callers can say "yes" or "no" (or press 1 for yes or 2 for no). Sample Responses If response is Yes, go to [ 30 – Account Number ▼ ]   View
If response is No, go to [ 40 – Set up ▼ ]   View 404d

[ SAVE ]   [ SAVE&EXIT ]   [ EXIT ]

Figure 5A:
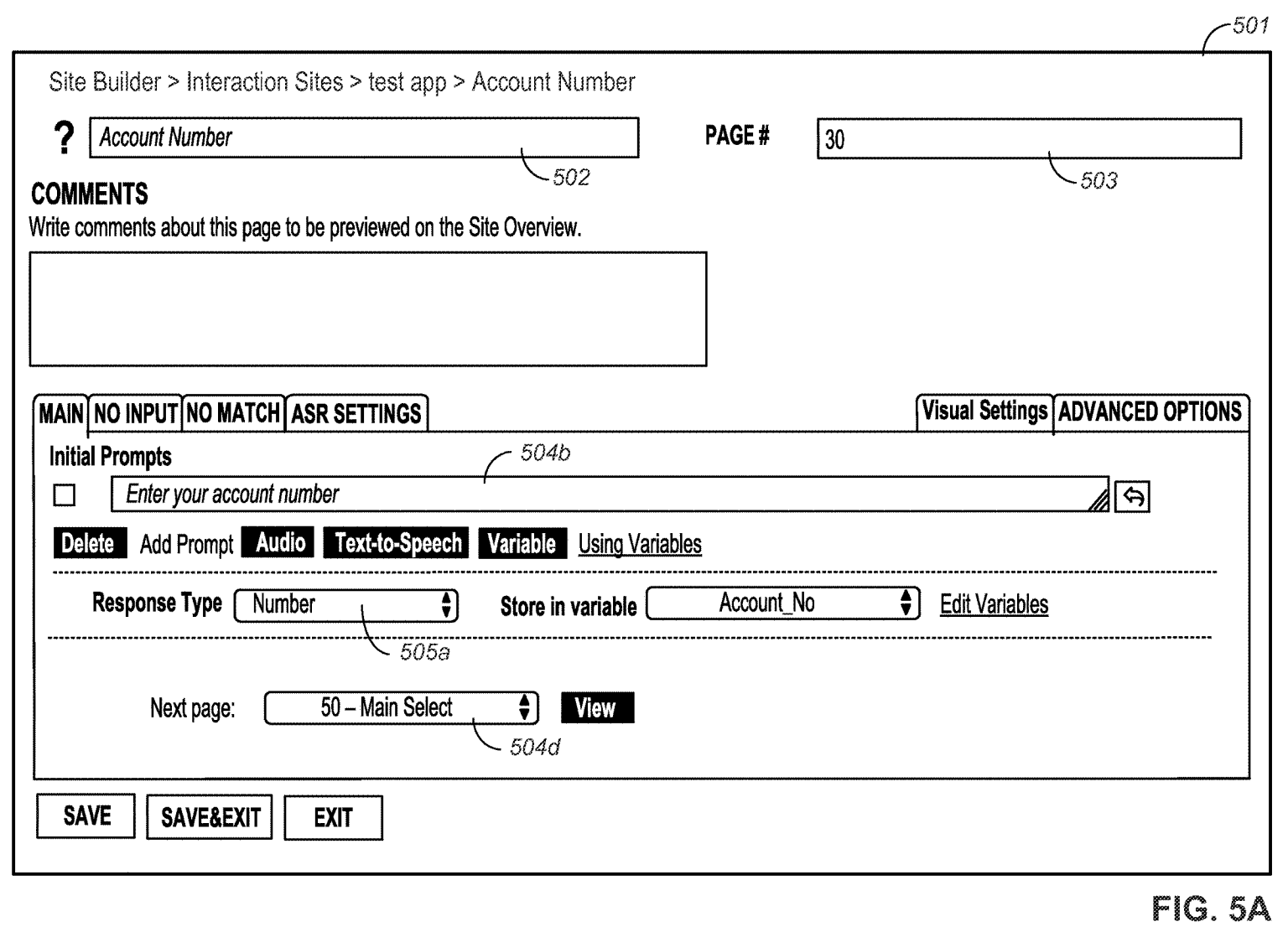

Site Builder > Interaction Sites > test app > Account Number

? Account Number — 502

PAGE # [30] — 503

COMMENTS
Write comments about this page to be previewed on the Site Overview.

| MAIN | NO INPUT | NO MATCH | ASR SETTINGS |

Initial Prompts
☐ Delete  Add Prompt  Audio  Text-to-Speech  Variable  Using Variables
  [Enter your account number] — 504b Response Type [Number ▼] — 505a  Store in variable [Account_No ▼]  Edit Variables Next page: [50 – Main Select ▼] — 504d  View

| Visual Settings | ADVANCED OPTIONS |

SAVE   SAVE&EXIT   EXIT

Site Builder > Interaction Sites > test app > Account Number

? Account Number

PAGE # 30

COMMENTS
Write comments about this page to be previewed on the Site Overview.

MAIN | NO INPUT | NO MATCH | ASR SETTINGS | Visual Settings | ADVANCED OPTIONS

Title  Account Number

Navigations Controls
☒ Back    ☒ Next    ☐ End the Session

Other Controls
☒ Call    ☒ Help

SAVE   SAVE&EXIT   EXIT

FIG. 5B

Site Builder > Interaction Sites > test app > Main Select

? *Main Select* ~601

PAGE # [50] ~603

COMMENTS
Write comments about this page to be previewed on the Site Overview.

[                    ] ~602

| MAIN | NO INPUT | NO MATCH | ASR SETTINGS |   | Visual Settings | ADVANCED OPTIONS |

Initial Prompts
☐ *How can we help you today?*  ~604b
Delete  Add Prompt  Audio  Text-to-Speech  Variable  Using Variables Response Type [Keyword ▼]   Store in variable [Qn_help ▼]   Edit Variables
              ~605a The system will store the text entered in the Save Value field when the corresponding keyword is spoke or touch-tone sequence is pressed.

| Keywords |   | Values | Next Page |
| Billing  | 631a | 1 | 60 – Billing  ▼ | View |
| Sales    | 631b | 2 | 70 – Sales    ▼ | View |
| Support  | 631c | 3 | 80 – Support  ▼ | View |
                                     ⎬ 604d ☐ Delete  Add Keywords  1  5  10

[SAVE]  [SAVE&EXIT]  [EXIT]

FIG. 6A

Site Builder > Interaction Sites > test app > Main Select

? *Main Select*

COMMENTS
Write comments about this page to be previewed on the Site Overview.

PAGE # 50

| MAIN | NO INPUT | NO MATCH | ASR SETTINGS | Visual Settings | ADVANCED OPTIONS |

Title: Your Account

Navigations Controls
☒ Back  ☒ Next  ☐ End the Session

Other Controls
☒ Call  ☒ Help

VIVR Display Options | Click to Continue ▼

SAVE  SAVE&EXIT  EXIT

FIG. 6B

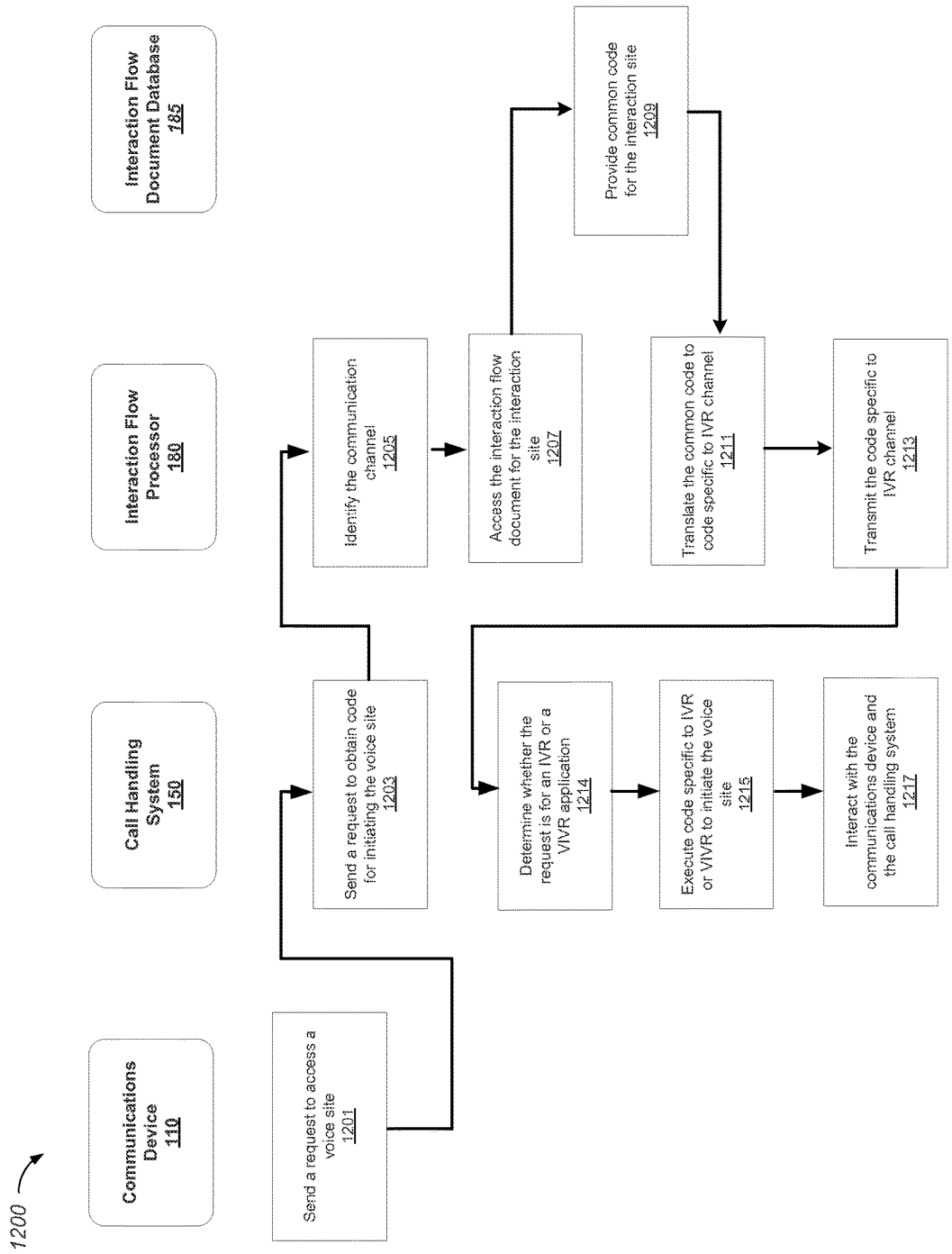

VISUAL INTERACTIVE VOICE RESPONSE SYSTEM

CROSS-REFERENCE TO RELATED APPLICATION

This application is a continuation of U.S. patent application Ser. No. 14/683,894, filed on Apr. 10, 2015, now U.S. Pat. No. 9,467,563, the disclosure of which is hereby incorporated by reference in its entirety.

BACKGROUND

The following disclosure relates generally to the development and delivery of a multi-channel interaction application. A user may use a personal communications device to contact a company to discuss a service or a product provided by the company. The user may contact the company by establishing electronic communications with the company over a voice channel or a data channel.

SUMMARY

In a general aspect, a request is received by an application server and from a communications device to execute an interaction site for enabling communications to be exchanged between an automated response system and the communications device, where the interaction site specifies a multi-step communication flow between the communications device and the automated response system. A request to execute the interaction site is transmitted from the application server to the automated response system. First instructions that, when executed, provide one or more steps of the multi-step communication flow between the communications device and the automated response system are received from the automated response system by the application server. Whether the request from the communications device is for a voice-interaction with the interaction site or a visual-interaction with the interaction site is determined by the application server. In response to determining that the request from the communications device is for the voice-interaction with the interaction site, second instructions that, when executed by the communications device, provide the one or more steps through a voice interaction with a user of the communications device are determined by the application server based on the first instructions. The second instructions are transmitted from the application server to the communications device. In response to determining that the request from the communications device is for the visual-interaction with the interaction site, Third instructions that, when executed by the communications device, provide the one or more steps through a visual interaction with the user of the communications device are determined by the application server based on the first instructions. The third instructions are transmitted from the application server to the communications device.

Implementations may include one or more of the following features. To transmit, from the application server and to the automated response system, the request to execute the interaction site, an indication that indicates whether the request from the communications device is for the voice-interaction with the interaction site or the visual-interaction with interaction site may be transmitted to the automated response system.

To determine whether the request from the communications device is for the voice-interaction with the interaction site or the visual-interaction with the interaction site, whether the request is received from a voice channel or a data channel may be determined. In response to determining that the request is received from the voice channel, the request is for the voice-interaction with the interaction site may be determined. In response to determining that the request is received from the data channel, the request is for the visual-interaction with the interaction site may be determined.

To determine whether the request from the communications device is for the voice-interaction with the interaction site or the visual-interaction with the interaction site, whether the request is based on hypertext markup language (HTML) may be determined. In response to determining that the request is based on HTML, the request from the communications device is for the visual-interaction with the interaction site may be determined.

Data representing a communication between the communications device and the automated response system may be stored, where the data may include an indication of whether the communication is visual. The interaction site may be associated with one or more interaction pages, where each interaction page may represent a respective step of the multi-step communication flow, and where the one or more voice interaction may be configured by a user of a content provider device through interactions with a development interface to include values for (i) one or more parameters associated with the voice-interaction with the interaction site, (ii) one or more parameters associated with the visual-interaction with the interaction site, and (iii) one or more parameters associated with both the voice-interaction and the visual-interaction with the interaction site. The second instructions may not include instructions generated using the values for the one or more parameters associated with the visual-interaction with the interaction site. The third instructions may not include instructions generated using the values for the one or more parameters associated with the voice-interaction with the interaction site.

The first instructions may be based on state chart extensible markup language (SCXML) or VoiceXML. The second instructions may based on voice extensible markup language (VoiceXML). The third instructions may be based on HTML5. The automated response system may be an interactive voice response system.

In another general aspect, a system includes one or more processors and one or more non-transitory computer-readable storage devices storing instructions that, when executed by the one or more processors, cause the one or more processors to perform operations including receiving, from a communications device, a request to execute an interaction site for enabling communications to be exchanged between an automated response system and the communications device, where the interaction site specifies a multi-step communication flow between the communications device and the automated response system; transmitting, to the automated response system, a request to execute the interaction site; receiving, from the automated response system, first instructions that, when executed, provide one or more steps of the multi-step communication flow between the communications device and the automated response system; determining whether the request from the communications device is for a voice-interaction with the interaction site or a visual-interaction with the interaction site; in response to determining that the request from the communications device is for the voice-interaction with the interaction site: determining, based on the first instructions, second instructions that, when executed by the communications device, provide the one or more steps through a voice interaction with a user of the communications device; and transmitting, to the communications device, the second instructions; and in response to determining that the request from the communications device is for the visual-interaction with the interaction site: determining, based on the first instructions, third instructions that, when executed by the communications device, provide the one or more steps through a visual interaction with the user of the communications device; and, transmitting, to the communications device, the third instructions.

The details of one or more implementations are set forth in the accompanying drawings and the description below. Other potential features and advantages will become apparent from the description, the drawings, and the claims.

BRIEF DESCRIPTION OF THE FIGURES

FIGS. 2A-2C illustrate a GUI for an application development tool that is used by a content provider to create a visual-IVR enabled interaction site.

FIGS. 4A-4B, 5A-5B, and 6A-6B illustrate a GUI for an application development tool that is used by a content provider to create visual-IVR enabled question pages.

FIG. 12 is a flow chart illustrating an example of a process for a user to communicate with a call handling system using a visual-IVR enabled voice site.

DETAILED DESCRIPTION

Figure 1:
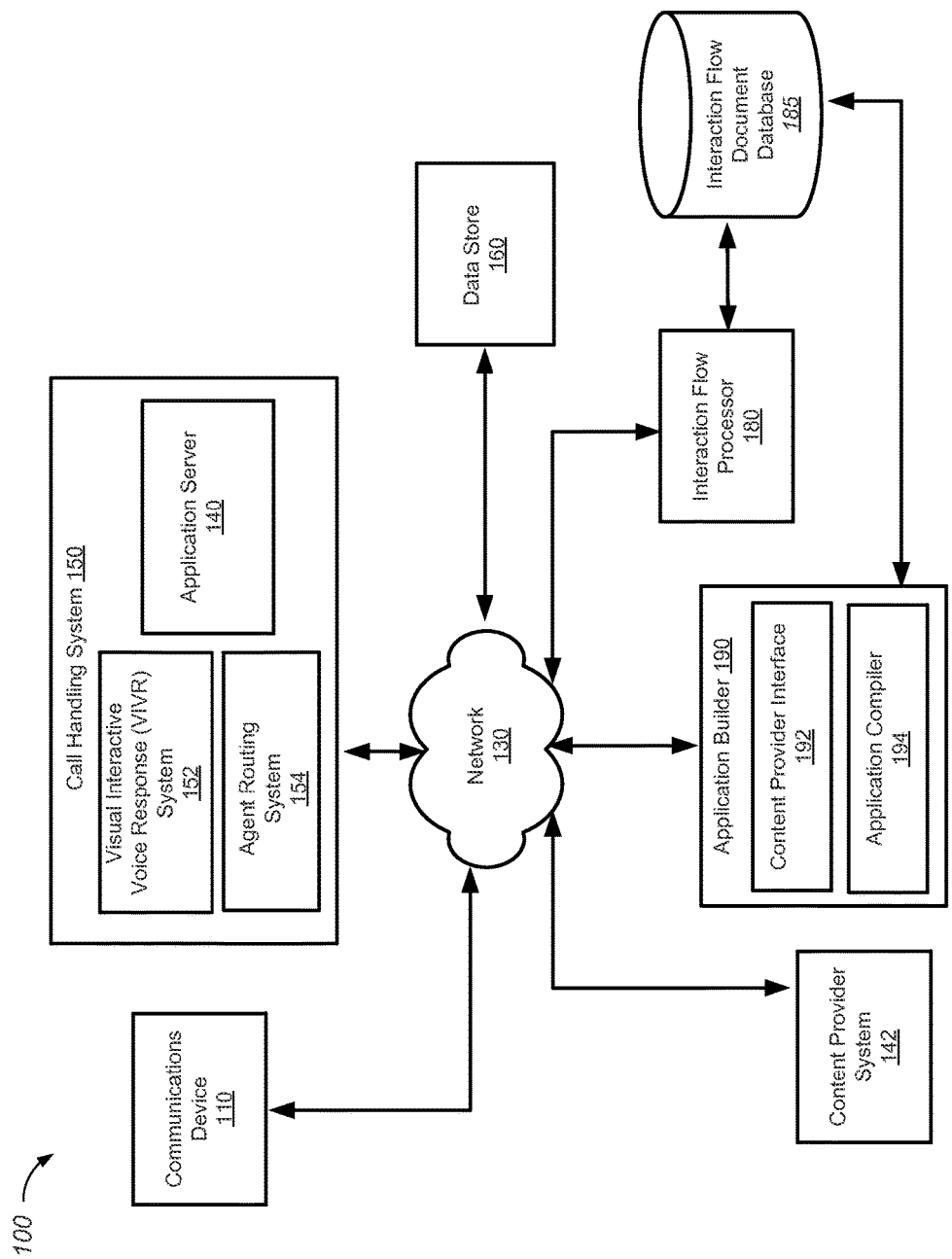
FIG. 1 is a block diagram of a communications system that provides development and access of visual-IVR enabled interaction sites.

A company may wish to enable its customers to contact it through use of any of multiple different communications channels (e.g., phone, email, chat, SMS or another communications channel that support communications between a customer and a service/product provider). To save costs, the company may wish to interact with the customers, at least initially, using an automated response system. Use of such an automated response system may decrease the costs associated with responding to customer contacts by decreasing the number of human agents that need to be employed to respond to the customer contacts. Many customer contacts are for routine inquiries (e.g., a customer contacts the company to check the balance of a checking account or of a credit card) and, therefore, lend themselves well to being efficiently and cost-effectively handled through use of an automated response system. In contrast, more complex customer contacts, which are typically far fewer in number, may be routed to human agents for handling.

The interaction between a customer and an automated response system may be designed by a content provider offering the service using an interaction flow that segments the interaction into multiple discrete steps. For example, when a customer dials a company's telephone number to pay a bill, a voice interaction flow may include the steps of (i) acquiring the customer's account number, (ii) informing the customer of a current balance, (iii) acquiring the customer's payment information, (iv) processing payment, and (v) conducting a customer satisfaction survey. An interactive voice response system (IVR) is an example automated response system that supports a voice-based interaction between a user operating a telephonic device and a third party automated application, where the user interacts with the third party automated application following the multi-step interaction flow that both provides and collects information to and from the user using voice communications with the IVR.

Many advanced telephonic devices (e.g., smart phones) include functionalities that support visual interactions with users. For example, a smart phone may display information to a user on a display using a scripting language such as HTML5. As another example, a touchscreen of a smart phone may allow a user to navigate through content by touching the touchscreen. As another example, a smart phone may allow a user to input text information as an alternative of using voice. Given that some users may wish to visually interact with a third party automated application instead of using voice, having an automated response system that can enable both voice and visual interactions with users using a same interaction flow may be useful. A visual IVR (VIVR) system may be implemented to process a multi-step interaction according to its current state, where the processing is independent of whether the interaction is a visual interaction or a voice interaction. Notably, a visual IVR is an ARS that is able to support voice only and visual only applications, and also a mixed voice-visual application.

More specifically, a user of a particular product or service provided by a company may need to contact customer service for the product or service to troubleshoot a problem the user is experiencing in using the product or service. In order to contact the customer service and obtain a solution to the problem, the user may use a smart phone to call a known customer service number for the product or service. By calling the customer service number, the user may get connected to a call handling system that enables the user to have a voice interaction with a voice site associated with the product or service according to an interaction flow. Alternatively, the user may initiate a visual interaction with the voice site using a client-side application running on the smart phone, where the voice site may be accessed by entering a uniform resource identifier (URL) in the client-side application. By entering the URL, the user may get connected to the call handling system that enables the user to have a visual interaction with the voice site associated with the product or service according to the same interaction flow. End user has option to go through automated service either through voice or mobile web channel or both at the same time.

A voice site is a set of scripts or, more generally, programming language modules corresponding to one or more linked pages that collectively interoperate to produce an automated interactive experience with a user. A standard voice site includes scripts or programming language modules corresponding to at least one voice page and limits the interaction with the user to an audio communications mode. Because customers typically access a voice site by calling a telephone number using a telephone, a standard voice site is typically referred to as a single channel interaction site, i.e., an interaction site that supports a single type of contact. A VIVR enables customers to visually interact with the voice site by entering a URL on a telephonic device, and thus the standard voice site may be expanded into a multi-channel interaction site.

The voice site accessed by the user may be an automated interactive voice site that is configured to process, using pre-programmed scripts, information received from the user that is input through the telephonic device being used by the user, and, in response, provide information to the user that is conveyed to the user through the telephonic device. The interaction between the user and the voice site may be done using a VIVR provided by a service provider that is hosting the voice site and an application server that acts as a gateway between the telephonic device and the VIVR.

For either a voice interaction or a visual interaction, the VIVR may be configured to support commands and information using scripts that are pre-programmed for the voice site, for example, voice-extensible markup language (VoiceXML) scripts or state chart XML (SCXML) scripts. In a voice interaction, the VIVR interacts with the user by using audible commands to prompt the user to provide information and enabling the user to input the information by speaking into the telephonic device or by pressing buttons on the telephonic device (when using, for example, a touch-tone telephone). The information input by the user is conveyed to the VIVR over a voice communications session that is established between the telephonic device and the IVR when the call is connected, with the application server as a gateway. Upon receiving the information, the VIVR processes the information using the pre-programmed scripts. The VIVR may be configured to send audible responses back to the user via the telephonic device.

In a visual interaction, scripts that are pre-programmed for the voice site may be translated by an application server into a different programming or scripting language (e.g., HTML5) such that the translated scripts may be visually presented to the user using a client-side application running on the telephonic device. The VIVR interacts with the user by using visual commands to prompt the user to provide information and enabling the user to input the information by entering text and numbers using the telephonic device. The information input by the user is translated by the application server and conveyed to the VIVR over a data communications session that is established between the telephonic device and the VIVR, with the application server as a gateway. Upon receiving the information, the VIVR processes the information using the pre-programmed scripts. Notably, the processing of the information by the VIVR may be the same regardless whether it is a voice interaction or a visual interaction. This also allows customers to switch from one channel, say voice, to another channel (mobile web like HTML5) without losing context.

Distinguishable from a visual presentation of a standard voice site, an enhanced voice site may include scripts or programming language modules corresponding to at least one voice page and at least one multimodal action page linked to the at least one voice page that enable interaction with the user to occur via an audio communications mode and at least one additional communications mode (e.g., a text communications mode, an image communications mode or a video communications mode). For example, a customer may call a contact center from a smart phone and may be placed on hold in a queue. If the wait time exceeds a threshold, the voice site may offer a hyperlink visually to the customer via the smart phone, where the customer may click on the hyperlink to schedule a call back. As another example, a customer may call a contact center to schedule an appointment, where a voice site may enable visual interaction with the user by showing a calendar for making the appointment. As another example, during a voice call with a customer, an agent may offer visual assistance to the customer by pushing through SMS, email, or a push notification of a session to a calendar on the customer's smart phone. As another example, upon completion of an interaction with a voice site, a customer may receive a call back from the interactive voice response system for a survey of the experience, where a link may be provided to the customer via the smart phone to allow the customer to visually rate the experience with the voice site. An enhanced voice site may, therefore, be referred to as a voice site that has been enhanced to enable some portions of the interaction flow to involve the communication of multimedia information. In some implementations, an enhanced voice site may be configured to support multimedia information including audio, video, images and text. Notably, the voice pages in an enhanced voice site may be accessed as either a voice interaction or a visual interaction using VIVR.

A voice site may be hosted by a third party service provider that facilitates the creation and hosting of voice sites, or more generally, interaction sites on servers owned and operated by the service provider. An interaction site may be a set of scripts or programming modules that offer a common interaction flow for handling contacts received over different channels. The set of scripts or programming modules may then be translated by an interaction flow processor into a corresponding set of channel-specific scripts or programming modules for each channel supported by the interaction site, and these translated channel-specific scripts or programming modules may then be executed by the respective sub-systems of the multi-channel communications system to enable automated interactions with users over the different channels. For example, the pre-programmed scripts of the interaction site may be extensible markup language (XML) scripts. If the user accesses the multi-channel communications system by using a telephone to call a telephone number associated with the interaction site, the interaction flow processor may translate the XML scripts of the interaction site to VoiceXML scripts for processing by an IVR to interact with the calling user.

The service provider may provide a service/method that enables the design, development, and hosting of VIVR-enabled interaction sites or applications that run a thin client on the communications device that interacts with a fully hosted, on-demand interaction solution platform maintained and managed by the service provider. The service/method provides a way to develop VIVR-enabled voice site that is supported by a VIVR system (the server side) and allows a voice or visual interaction between the client and the server to be established. In some implementations, the service/method may require an installation of a thin client engine (e.g., an application) on the communications device of the user that mediates between the objects and devices in the communications device and the multi-channel communications system supporting the interaction site hosted by the service provider.

In the above scenario, the role of the entity providing customer service through the interaction site is that of a content provider. The developer of the entity/company (hereinafter referred to interchangeably as the "content provider") configures the interaction site that is to be used for the particular product or service and provides the logic for the interaction site that is to be executed by the multi-channel communications system. The content provider may do so by using a graphical user interface (GUI) provided by the third party service provider for configuring the interaction site. The service provider handles the interpretation and compilation of the information provided by the content provider, and the creation and hosting of the interaction site based on the information. Since the service provider manages the multi-channel communications system, the service provider may allow the content provider to develop the interaction site using one unified GUI interface, where the interaction site is executable by the user via any one or more of multiple different communications channels.

The service/method thus enables the deployment of interaction-enabled solutions on communications devices without requiring the content provider to engage in complex programming. Applications, or interaction sites, may be designed by the content provider using a web-based or remotely accessible interface, and served on demand to clients. In some implementations, clients can be add-ons that smart phone applications can plug into. In some implementations, the service/method enable users to interact with a VIVR application. The VIVR application enables users to contact and interact with a VIVR-enabled voice site via a voice channel or a data channel.

FIG. 1 is a block diagram of a communications system 100 that provides a development platform for VIVR-enabled interaction sites and access to these VIVR-enabled interaction sites in a multi-channel solution platform. Referring to FIG. 1, a user of a communications device (i.e., a smart phone) 110 is able to interact with the communications device 110 to request a service from a VIVR-enabled interaction site that is provided, for example, by a content provider. The service may be, for example, a request to purchase a particular product or service offered by or made available by the content provider through the interaction site. For example, the user may indicate a desire to request a service from the interaction site by selecting a graphically displayed icon on a graphical user interface (GUI) of the communications device 110 to thereby invoke an application stored in the communications device 110 with which the user can interact to initiate a service request. Additionally or alternatively, the user may indicate a desire to request a service by inputting, via manual selection or otherwise, a telephone number associated with the customer service department into the communications device 110 and initiating a call directed to the inputted telephone number. Additionally or alternatively, the user may indicate a desire to request a service via a communications channel not listed in the above examples.

In some implementations, the request for the service or product may be directed to an application server 140 of a handling system 150. The application server 140 may forward the request to a VIVR system 152 of the call handling system 150, and an interaction site may be invoked, where the VIVR system 152 communicates with the communications device 110 through the application server 140 to provide the requested service. As mentioned previously, an interaction site may be hosted by a third party service provider that facilitates the creation and hosting of interaction sites on servers owned and operated by the service provider. Depending on the communications means that a user uses to access the VIVR-enabled interaction site, the application server 140 may process the communications between the VIVR system 152 and the communications device 110 according to the communications means to process the request. For example, a call handling system may present the interaction site to the user using voice messages that are generated by VoiceXML scripts. If the interaction is a visual one, the application server 140 may translate the voice messages into corresponding messages in a different scripting or programming language (e.g., HTML5), so the corresponding messages may be displayed on the communications device 110. It also allows to offer additional contents like graphics, video as well as audio to the users which are not supported over IVR. This not only complements the IVR functionality as well as extends it.

In many applications, the flow for providing a service to the user includes the same steps regardless of which communications form the user is using. From a content provider's perspective, it is a burden to require developing a VIVR-enabled interaction site for each of the communications forms (e.g., a voice interaction or a visual interaction) using different tools or scripting languages. From a service provider's perspective, the storage and management of a VIVR-enabled interaction site having different versions for each of the communications form may be complicated. Accordingly, a communications system that can integrate the development of a VIVR-enabled interaction site for each of the communications forms using one development platform, and compile the developed interaction site into one scripting language that can be translated based on the communications channel used by a user may enable a content provider and/or service provider to enjoy a decrease in costs associated with developing and managing interaction sites without compromising the quality of the user experience with the VIVR-enabled interaction site.

The communications system 100 is an example implementation of a system that supports an interactive VIVR application delivery platform. In general, the communications system 100 includes the communications device 110, a network 130, the call handling system 150, a content provider system 142, a data store 160, an interaction flow processor 180, an interaction flow document database 185, and an application builder 190.

The communications device 110 is configured to allow a user to interact with the call handling system 150 across the network 130. The communications device 110 may be a cellular phone or a mobile personal digital assistant (PDA) with embedded cellular phone technology. The communications device 110 may be a computer that includes one or more software or hardware applications for performing communications between the communications device 110 and the multi-channel communications system 135. For example, a web browser may be installed on the communications device 110 to allow the user to access a VIVR-enabled voice site using a URL. As another example, a mobile application that is developed by a content provider may be installed on the communications device 110 to allow the user to access a VIVR-enabled voice site of the content provider directly using the mobile application. As another example, a mobile application that is developed by a service provider may be installed on the communications device 110 to allow the user to access different VIVR-enabled voice sites of different content providers using the mobile application. The communications device 110 may have various input/output devices with which a user may interact to provide and receive audio, text, video, and other forms of data.

The network 130 may include a telephone network, a data network, or a combination of the telephone network and the data network. The telephone network may include a circuit-switched voice network, a packet-switched data network, or any other network able to carry voice data. For example, circuit-switched voice networks may include a Public Switched Telephone Network (PSTN), and packet-switched data networks may include networks based on the Internet protocol (IP) or asynchronous transfer mode (ATM), and may support voice using, for example, Voice-over-IP, Voice-over-ATM, or other comparable protocols used for voice data communications. The data network is configured to enable direct or indirect communications between the communications device 110 and the call handling system 150. Examples of the data network include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data. In some implementations, the data network and the telephone network are implemented by a single or otherwise integrated communications network configured to enable communications between the communications device 110 and the call handling system 150.

A call handling system 150 receives the request and interacts with the communications device 110 to provide the requested service through the VIVR-enabled voice site. The call handling system 150 may include a VIVR system 152 and an application server 140. In some implementations, the call handling system 150 may additionally include an agent routing system 154.

The VIVR system 152 may include a voice gateway coupled to an interaction flow processor 180 via the network 130. Alternatively, the voice gateway may be local to the interaction flow processor 180 and connected directly to the interaction flow processor 180. The voice gateway is a gateway that receives user calls from or places calls to voice communications devices, such as the communications device 110, and responds to the calls in accordance with a voice program that corresponds to a flow of an interaction site. The voice program may be accessed from local memory within the voice gateway or from the interaction flow processor 180. In some implementations, the voice gateway processes voice programs that are script-based voice applications. The voice program, therefore, may be a script written in a scripting language such as, for example, voice extensible markup language (VoiceXML), SCXML, or speech application language tags (SALT). The VIVR system 152 may also be configured to communicate with the data store 160 to read and/or write user interaction data (e.g., state variables for a data communications session) in a shared memory space.

The application server 140 is configured to establish a voice or a visual communications session between the communications device 110 and the VIVR system 152, and to receive and send data to the communications device 110 across the network 130. The application server 140 is configured to communicate with the VIVR system 152 to send data received from the communications device 110. The application server 140 also may send other application-related data that did not originate from the communications device 110 to the VIVR system 152. For example, the application server 140 may send to the VIVR system 152 data indicating whether the communications session is voice or visual. In some implementations, the application server 140 is configured to communicate with the data store 160 to read and/or write user interaction data (e.g., state variables for a data communications session) in a shared memory space. As shown in FIG. 1, the application server 140 and the call handling system 150 are a single integrated computer system. In some other implementations, the application server 140 may be one or more computer systems that operate separately or in concert under the direction of one or more software programs to perform the above-noted functions.

The agent routing system 154 of the call handling system may include, among other components, an inbound call queue, an outbound call request queue, a call router, an automatic call distributor ("ACD") administrator, and contact information of a plurality of agents. The agent routing system 154 may receive one or more calls from one or more voice communication devices, such as the communications device 110, via the network 130 and may make one or more outbound calls to voice communication devices of an agent via the network 130. The agent routing system 154 may determine an appropriate agent to route the call to or to assign an outbound call to. The determination of an appropriate agent may be based on agent skills, agent performance metrics and information known about the inbound or outbound call and the status of the agent.

The interaction flow processor 180 includes all hardware and software components that interface and provide data to the call handling system 150. In some implementations, the interaction flow processor 180 sends translated application programs or scripts to the call handling system 150 for processing user interactions with a voice site. The user interactions are analyzed by the call handling system 150 and new programs or scripts that correspond to the next state of the interaction flow may then be sent to the call handling system 150 for further processing. In some implementations, the interaction flow processor 180 may determine which programs or scripts to provide to the call handling system 150 based on some or all of the information received from the call handling system 150 or the communications device 110.

The interaction flow document database 185 stores interaction flow documents created by the application builder 190, and provides the interaction flow processor 180 access to these interaction flow documents. In some implementations, the interaction flow document database 185 may be an array of high-capacity storage drives that are closely coupled to the interaction flow processor 180. In some implementations, the interaction flow document database 185 may be an array of high-capacity storage drives that are closely coupled to the application builder 190.

The content provider system 142 is configured to allow a content provider to interact with the application builder 190 across the network 130. The content provider system 142 may be a cellular phone or a mobile personal digital assistant (PDA) with embedded cellular phone technology. The content provider system 142 may be a computer that includes one or more software or hardware applications for performing communications between content provider system 142 and the application builder 190. The content provider system 142 may have various input/output devices with which a content provider may interact to provide and receive audio, text, video, and other forms of data from the application builder 190.

The application builder 190 facilitates the creation of interaction sites that include voice sites. The application builder 190 utilizes various components to enable the creation of interaction sites. The various components of the application builder 190 may be co-located in a single physical location, or they may be geographically distributed, with dedicated high capacity links interconnecting the various components. The application builder 190 may include a content provider interface 192 and an application compiler 194.

The content provider interface 192 is a GUI front-end for an application development tool that can be used to build an interaction site that is capable of handling interactions using multiple communications channels. The content provider may access the content provider interface 192 over the network 130. For example, the content provider may use a web browser that runs on the content provider system 142. By accessing the application development tool using the content provider interface 192, the content provider may create interaction sites and interaction pages that will be used by the call handling system 150 when processing a request to the interaction site being created by the content provider. In the context of this discussion, a "page" is a discrete programming routine configured to perform a discrete function. A page may be defined by a user through an interaction with, for example, a GUI in which the user may indicate the type of programming routine for the page and may optionally further indicate one or more other pages linked to the page. Processing may then proceed to the one or more other linked pages after completion of execution of the page or, alternatively, after initiation of execution of the page but before completion of execution of the page. A page may be compiled into one or more programming language modules or scripts after the page is defined by the user through interaction with the GUI. The one or more programming language modules or scripts may be used, for example, by a handling system to execute the discrete programming routine to thereby perform the discrete function of the page. Examples of different pages include message pages, question pages, logic pages, transaction pages, and multimodal action pages. These different pages are described in further detail in issued U.S. Pat. No. 8,582,727, which is incorporated herein by reference for all purposes.

An interaction page is a particular type of page that is configured to perform the function of delivering content to and/or receiving content from a user via a communications channel used by the user to contact a multi-channel system (e.g., voice communications channel for telephone contacts, chat communications channel for chat contacts, email communications channel for email contacts, and SMS communications channel for SMS contacts). A "voice page" is a particular type of interaction page that is configured to perform the function of delivering audible content to and/or receiving audible content from a user that called a telephone number assigned to the voice site. A VIVR-enabled voice page may further provide and/or receive visual content from the user that accesses the voice site using the communications device 110. FIGS. 2A-2B, 3A-3B, and 4A-4B, 5A-5B, and 6A-6B illustrate examples of one or more pages provided by a GUI of an application development tool.

The interaction sites and pages created by the content provider using the content provider interface 192 are interpreted and/or compiled by an application compiler 194 to generate scripts that are executed by the multi-channel communications system interacting with a user accessing the interaction site. In some implementations, the application compiler 194 may generate an interaction flow document, which may include XML scripts or code that correspond to pages (i.e., programming modules) of an interaction site created by the content provider. For example, the XML scripts may be SCXML scripts. The interaction flow document may be stored in an interaction flow document database 185. The interaction flow processor 180 may access the scripts from the interaction flow document database 185 and translate them into a language that can be processed by a particular handling system when the call handling system 150 interacts with a user accessing a voice site.

In addition to the XML scripts, the application compiler 194 may also generate other types of scripts (e.g. Java scripts) and other types of executable code using other programming languages based on pages created for the interaction site by the content provider (e.g., based on transaction pages). The other types of scripts may be used by the call handling system 150 to interact over the data network 130 with the user accessing the interaction site.

The data store 160 is configured to store user interaction data with interaction sites. In some implementations, the data store 160 may store interaction data associated with a particular user. For example, the interaction data may include the gender and other characteristics of the user, the choices made by the user during each state of the interaction, and the resources utilized during each state of the interaction. In some implementations, the data store 160 may store aggregated interaction data associated with a particular interaction site. For example, the aggregated interaction data may include data specifying a breakdown of genders among all users that accessed the particular interaction site. In some implementations, a user may opt-out such that her usage data is then not stored in the data store 160. In some implementations, a user may opt-in to have her usage data be stored in the data store 160.

Figure 2A:
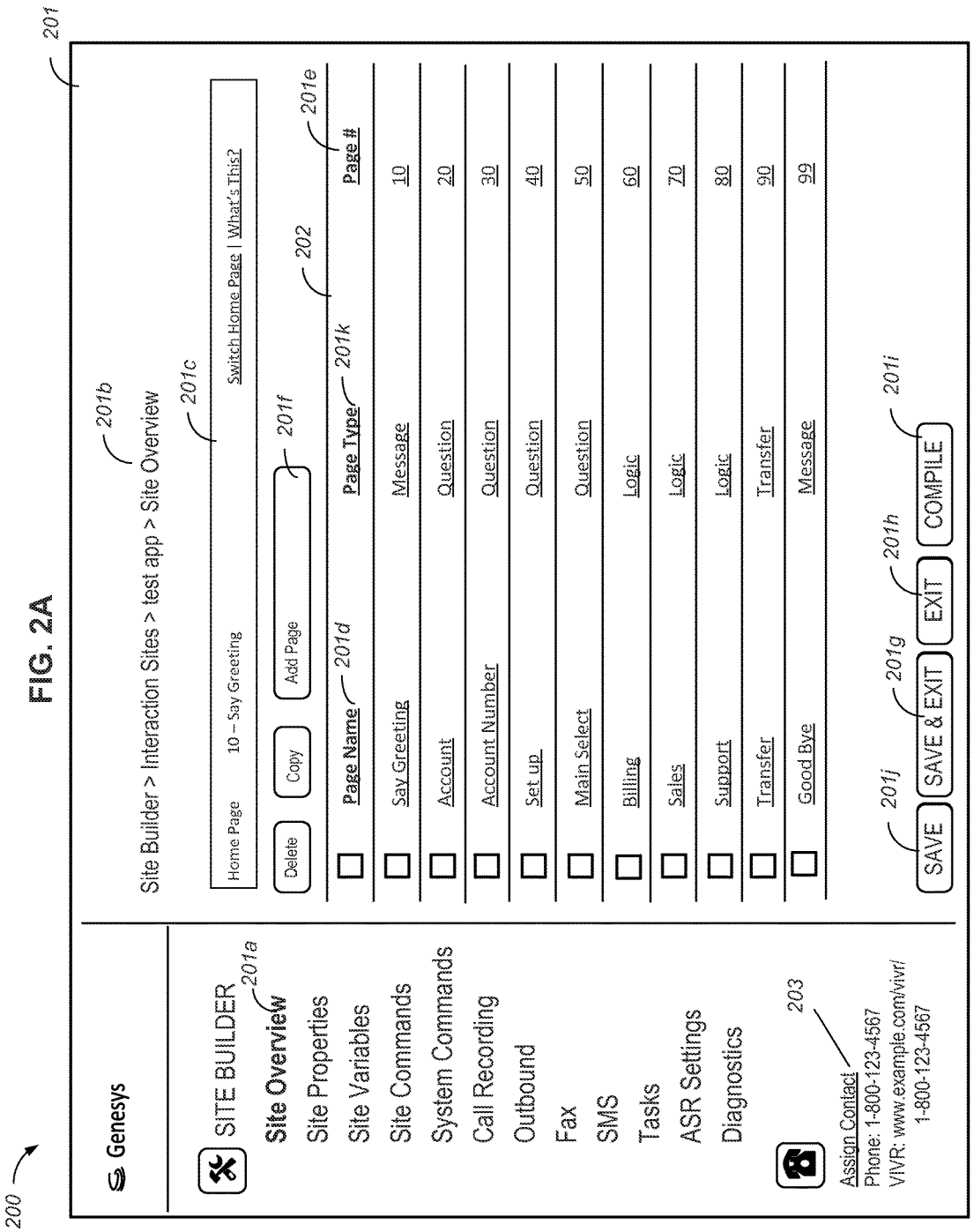
Figure 2B:
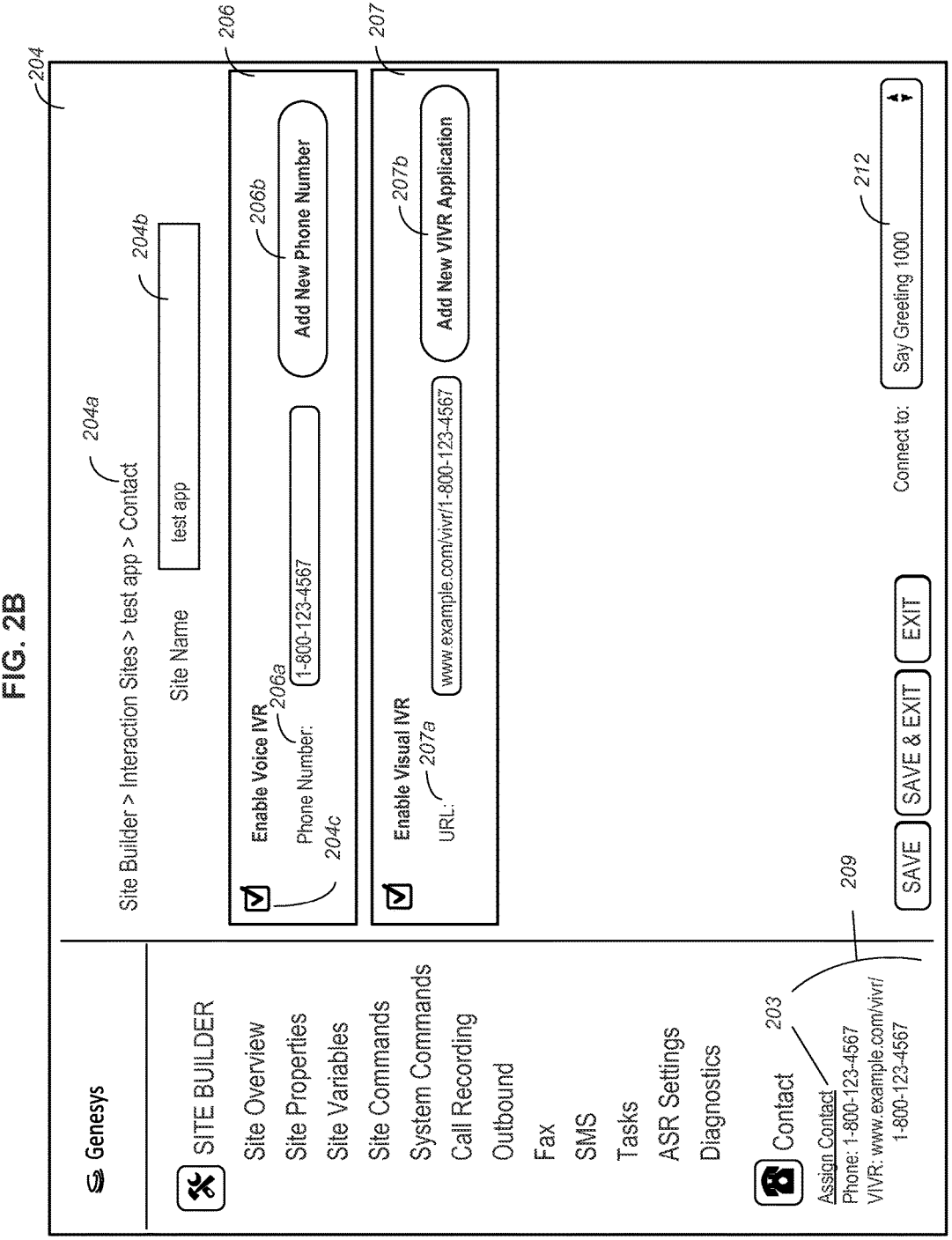

FIGS. 2A-2B illustrate a GUI 200 for an application development tool that is used by a content provider to create a VIVR-enabled interaction site. In general, each interaction site includes a flow of the interaction states that provide an overview of how users interact with the interaction site during the execution of the interaction site. A state may be configured using a page, such as, for example, a voice page or, more generally, an interaction page. In some implementations, the states of the flow for an interaction site are the same across multiple communications channels. For example, a first user may access a VIVR-enabled voice site by calling a telephone number associated with the voice site, and in the first state, the first user would experience a "Say Greeting" voice page which greets the first user via voice. A second user may access the same voice site visually using an application by entering a URL associated with the voice site, and according to the same flow, the second user would also interact with the "Say Greeting" interaction page which greets the second user via a visual interface. It may be a tedious process if the content provider is required to configure the same greeting message for both voice and visual interactions. The content provider interface 192 of the application builder 190 provides the content provider with a unified interface to create and configure pages that are common to both voice and visual interactions without the need to enter duplicate information for these interactions. The GUI 200 may be implemented by the content provider web interface 192 and presented to the content provider 142 when the content provider 142 accesses the application builder 190 using a web browser over the network 130 to create/manage the VIVR-enabled interaction site. The following describes the different components of the GUI 200 with respect to the system 100 that is described with reference to FIG. 1. Specifically, the components of the GUI 200 are described as used by the content provider 142 to create an interaction site for providing an ordering service to users of a product associated with the content provider 142. However, the GUI 200 and the associated application development tool may be used by other systems, content providers or application developers to create any interaction site to perform any desired automated interaction flow in response to a customer contact.

FIG. 2A illustrates an example GUI of an interaction site overview page 201 that is presented to the content provider when the content provider logs into the application builder 190 (e.g., by inputting a user identifier and a password) to create an interaction site using the content provider system 142. The Site Overview page 201 may be accessed by the content provider, for example, by selecting an interaction site from among a displayed list of interaction sites associated with (e.g., designed by or for) the content provider, clicking on the desired interaction site (e.g., "test app") and then clicking on the "Site Overview" link 201a. The Site Overview page 201 provides a listing of the different pages created by the content provider to define the interaction site. The Site Overview page 201 lists all the pages that are included in the interaction site. The name of the interaction site is specified in the heading 201b of the Site Overview page 201 (e.g., "test app").

When the user of communications device 110 interacts with the interaction site, the first page that is processed is identified in the "Home Page" field 201c. The content provider may specify any page that the content provider wants to be processed first as the Home Page 201c. In some implementations, the first page in the listing of pages is the same page that is listed as the "Home Page" 201c. However, in other implementations, the page that is as the "Home Page" 201c is not the first page in the listing of the pages in the Site Overview page 201.

The order in which the various pages are processed is determined by the links in the respective pages. Each page usually contains a link to the next page that is to be processed. For example, the interaction site illustrated in the Site Overview page 201 has a page flow 202 of ten interaction pages, including the interaction pages "Say Greeting", "Account", "Account Number", "Set up", "Main Select", "Billing", "Sales", "Support", "Transfer", and "Goodbye." Each of the pages may be identified by a page name that is shown in the Page Name field 201d. In addition or as an alternative to the page name, each page also may be identified by a page number that is shown in the Page # field 201e. The page name and page number of a page are specified by the content provider when creating the pages for the interaction site. A page may have a unique page name, or it may have a page name that is similar to the page name of another page. In case two or more pages share the same page name, they may be differentiated based on the page numbers. The combination of page name and page number uniquely identifies a page. A user may access and modify any of the pages displayed in the page flow 202 by selecting them from the displayed list. In addition, each page may be associated with a page type as shown in the Page Type field 201k. The types of pages that may be created by the content provider using the application development tool may include, for example: (1) a message page; (2) a question page; (3) a logic page; (4) a transaction page; (5) a data page; and (6) a multimodal action page. These different pages are described in further detail in issued U.S. Pat. No. 8,582,727, which is incorporated herein by reference for all purposes.

Importantly, a second page that is processed after the processing of a first page may be said to be directly linked to that first page if the first page includes a direct link to the second page without any intervening pages therebetween. Alternatively, a second page may instead be said to be indirectly linked to the first page if that first page is linked to the second page in the interaction flow with one or more pages being processed between the processing of the first page and the processing of the second page.

In other implementations, the Site Overview page 201 may additionally or alternatively present the pages in a two dimensional or three dimensional display that visually depicts the links between the pages. For example, each page may be displayed as a page graphical element, such as, for example, a rectangle or a block, with one or more link graphical elements, such as, for example, lines, connecting the page graphical elements to other page graphical elements to which they are linked. Text may be overlaid on or displayed in proximity to the page and/or line graphical elements to communicate the identity of the corresponding page and/or the nature of the link between the elements.

The content provider may create a new page by clicking the "Add Page" button icon 201f. When the "Add Page" button icon 201f is clicked, a new page is added to the page flow 202. In response to selecting the button icon 201f, the GUI 200 may present a set of page templates for selection in, for example, a drop-down list. The page templates may include, for example, message pages, question pages, logic pages, transaction pages, and multimodal action pages. The user may select a page template from the list to generate a page of the corresponding type using the template. The template presents to the user the necessary fields and/or controls for that page type and the user may populate the fields (e.g., by typing text into the fields) and/or select the controls to generate a page of the corresponding type.

Alternatively, a new page may be created by copying a previously created page. The content provider may select the page to be copied by checking the checkbox to the left of the page to be copied and then selecting the "Copy" button. An existing page can be deleted by checking the checkbox to the left of the page, and then clicking the "Delete" button. The content provider may save the interaction site by clicking the "Save" button 201j. The content provider may save the interaction site and then exit the GUT 201 by clicking the "Save & Exit" button 201g. The content provider may exit the GUI 201 without saving the interaction site by clicking the "Exit" button 201h. The content provider may compile the interaction site by clicking the "Compile" button 201i, where the application compiler 194 may compile the input parameters into an interaction flow document, and may save the interaction flow document in the interaction flow document database 185.

FIG. 2B illustrates an example GUI 204 for defining the contact information for an interaction site. For example, the content provider may click on the "Assign Contact" link 203 to access the Contact page 204. The Contact page 204 is specified by the heading 204a, and the corresponding interaction site is specified by the Site Name field 204b. The Contact page 204 allows the content provider to enable voice IVR and/or visual IVR. Although not shown, additionally or alternatively, the Contact page 204 may also provide a listing of communications channels (e.g., SMS, IVR, Chat, and/or Email) that users may use to access the interaction site. The content provider may enable the type of IVR the users may use to access the interaction site by checking or unchecking the checkbox 204c associated with the IVR type. The content provider may select one or more IVR type that the interaction site will support, and, for each of the selected IVR type, the content provider may enter corresponding contact information to associate the contact information with the interaction site.

For the Voice IVR 206, the content provider may enter a Phone Number 206a (e.g., "1-800-123-4567"), and click the Add New Phone Number button 206b to associate the entered phone number with the interaction site. When the user of the communications device 110 enters the phone number on the communications device 110, the communications device 110 would communicate with the call handling system 150 and the interaction site would be launched, facilitating a voice interaction between the VIVR system 170 and the communications device 110.

For the Visual IVR 207, the content provider may enter a URL 207a (e.g., "www.example.com/vivr/1-800-123-4567"), and click the Add New VIVR Application button

207b to associate the entered URL with the interaction site. When the user of the communications device 110 enters the URL on the communications device 110, the communications device 110 would communicate with the call handling system 150 and the interaction site would be launched, facilitating a visual interaction between the VIVR system 170 and the communications device 110.

In the examples above, more types of communications channels may be added to the Contact page 204 depending on the requirements of the interaction sites and the capability of the multi-channel communications system 135. One or more additional parameters may be added or substituted for any of the channels in the examples above. For example, there may be multiple phone numbers (e.g., toll-free and local phone numbers) associated with the voice IVR 206.

The "Connect to" drop-down menu 212 allows the content provider to choose which of the pages in the page flow 202 to be processed when the user of communications device 110 accesses the interaction site using the information in the Contact page. In some implementations, the "Connect to" drop-down menu 212 defines the "Home Page" field 201c in FIG. 2A. Here, the content provider chooses the "Say Greeting" interaction page 10 as the home page of the interaction site. In some implementations, the user may select a different "connect to" page for different contacts (e.g., an email contact is connected to one page while a chat contact is connected to a different page).

The GUI 200 further includes a display 209 that illustrates all, one or a subset (e.g., all telephone contact points or all URL contact points) of the contact points associated with the interaction site. In some implementations, the display 209 shows a list of all of the contact points assigned to the interaction site by the user through interactions with GUI 204. The display 209 may be dynamically updated in response to and as the user interacts with the GUI 204 to add or remove contact points from the display. In the example shown in FIG. 2B, two different contact points have been assigned to the interaction site: (1) A telephone contact point, which is the telephone number "1-800-123-4567;" and (2) a VIVR contact point, which is the URL "www.example.com/vivr/1-800-123-4567."

FIG. 2C illustrates an example GUI 220 for defining the site properties for an interaction site. For example, the content provider may click on the "Site Properties" link 221 to access the Site Properties page 220. The Site Properties page 220 is specified by the heading 222. The Site Properties page 220 allows the content provider to input values for one or more parameters for the specified interaction site. For example, the VIVR Timeout parameter 223 allows the content provider to specify in the field 223a an amount of idle time for a VIVR session to expire. As another example, the Help URL parameter 224 allows the content provider to specify in the field 224a a URL that users can click on during a VIVR session to reach a help page (e.g., a Commonly Asked Question website, etc.). As another example, the Contact Us parameter 225 allows the content provider to specify in the field 225a a phone number that users can click on during a VIVR session to be directed to a voice interaction with a human agent or another voice application. As another example, the Logo parameter 226 allows the content provider to click on the Upload button 226a to upload a logo of the content provider to be displayed on the communications device 110 during a VIVR session. As another example, the Theme parameter 227 allows the content provider to click on the Upload button 227a to upload a theme (e.g., text color, background color and images, etc.) to be displayed during a VIVR session.

Figure 3A:
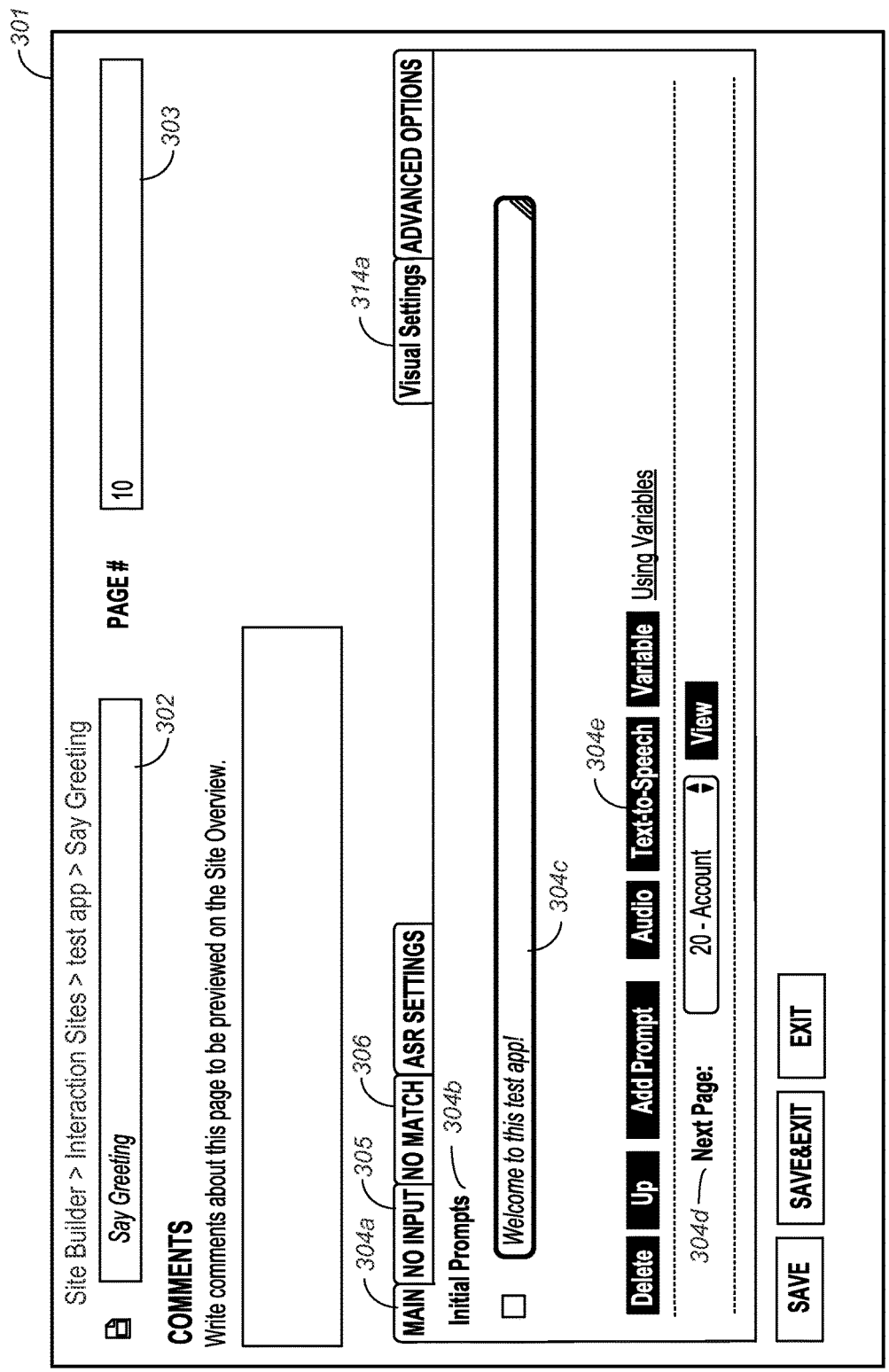
FIGS. 3A-3B illustrate a GUI for an application development tool that is used by a content provider to create a visual-IVR enabled message page.

FIG. 3A illustrates an example GUI 301 for configuring an interaction page (specifically, a message page) that is the first page that is processed for the interaction site in the event that the user accesses the interaction site via an IVR channel. The "Say Greeting" interaction page is identified by its page name 302 and/or page number 303. The page name 302 and the page number 303 correspond to the name of the page shown in the Page Name field 201d and the number of the page shown in the Page #field 201e respectively, shown in the Site Overview page 201 in FIG. 2A. Here, the GUI 301 allows the content provider to input parameters that configure the interaction page for the IVR channel, including both voice and visual interactions. As described below, some of the input parameters are common for both voice and visual interactions, while some of the input parameters are specific for either the voice or the visual interaction.

The main tab 304a of the interaction page allows the content provider to enter parameters that configure the interaction page for the IVR channel. In some implementations, some of these parameters in the GUI 301 are common for both voice and visual interactions. For example, the "Initial Prompts" parameter 304b allows the content provider to enter information that will be presented to the user independent of how the user accesses the VIVR-enabled voice site. The content provider inputs a prompt "Welcome to this test app!" in the "Initial Prompts" parameter 304c, where this prompt will be played to the user as an audio message if the interaction is voice, or displayed as a text message on the communications device 110 if the interaction is visual.

As another example, the next page parameter 304d is also common for both voice and visual interactions. The next page parameter 304d includes a pull-down menu that allows the content provider to specify which page is to be provided to the user after the initial prompts message is delivered to the user. In some implementations, the pages included in the pull-down menu reference to the pages in the page flow 202 defined by the content provider in FIG. 2A.

In some implementations, some of these parameters in the GUI 301 are specific for the IVR channel. For example, if the content provider clicks on the "Text-to-Speech" button 304e, another GUI (not shown) may be provided to the content provider, which enables the content provider to configure parameters that are related to the automated speech (e.g., gender, pitch, speed, etc.) converted from the text specified in the "Initial Prompts" parameter 304b.

The "No Output" tab 305 of the interaction page allows the content provider to enter parameters that configure the interaction page for the IVR channel in the case where there is no response received from the user. Similar to the main tab 304a, some parameters in the "No Output" tab 305 are common for both voice and visual interactions, and some parameters in the "No Output" tab 305 are specific for the voice or the visual interaction. The "No Match" tab 306 of the interaction page allows the content provider to enter parameters that configure the interaction page for the IVR channel in the case where the received response does not match a specified response type. Similar to the main tab 304a, some parameters in the "No Match" tab 306 are common for both voice and visual interactions, and some parameters in the "No Match" tab 306 are specific for the voice or the visual interaction.

The examples describe above for the IVR channel are not limiting. A GUI for developing an interaction page used in an IVR communications environment may have more or fewer configurable parameters than the GUI 301 described in FIG. 3A.

Figure 3B:
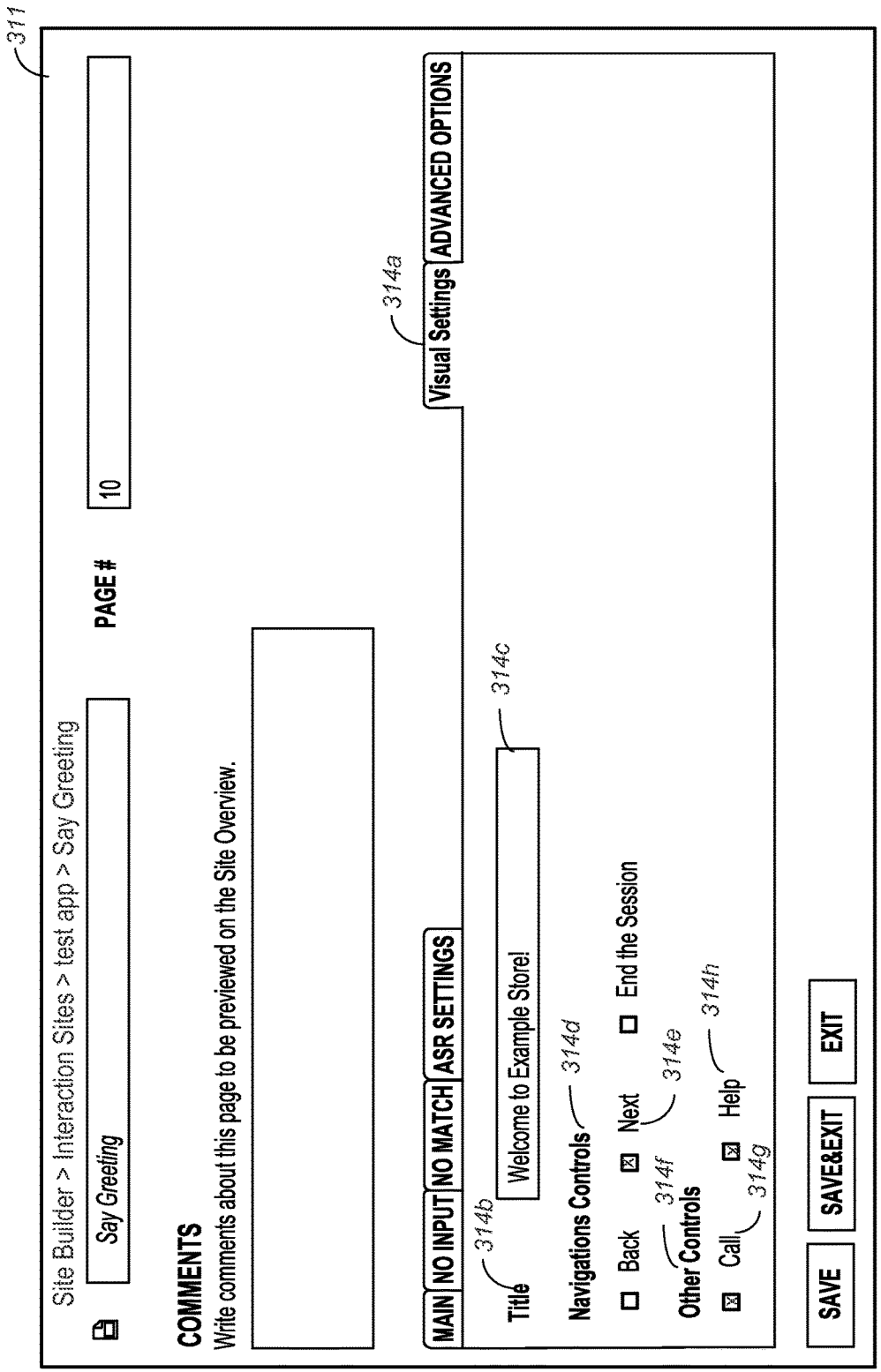

FIG. 3B illustrates an example GUI 311 for configuring parameters associated with a visual interaction of the first page that is processed for the interaction site in the event that the user initiates a visual interaction with the interaction site. The Visual Settings tab 314a of the interaction page allows the content provider to enter values for parameters associated the visual interaction. These parameters will not be processed if the user access the interaction site through a voice interaction. For example, the "Title" parameter 314b allows the content provider to enter information that will be presented to the user as a title of the voice page when the user accesses the VIVR-enabled voice site through a visual interaction. The content provider inputs text "Welcome to Example Store!" in the field 314c, where this text will be displayed on the communications device 110 if the interaction is visual.

As another example, the "Navigations Controls" parameter 314d allows the content provider to specify navigation controls through check boxes to allow the user to navigate the voice pages according to the interaction flow of the interaction site. Here, the content provider selects the "Next" checkbox, where a "Next" button will be displayed on the communications device 110 if the interaction is visual to allow the user to navigate to the next voice page in the interaction flow.

As another example, the "Other Controls" parameter 314f allows the content provider to specify additional controls for the interaction site during a visual interaction. The "Call" checkbox 314g allows a "Call" button to be displayed on the communications device 110 if the interaction is visual. If the user clicks on the "Call" button during a visual interaction with the voice page, the communications device 110 may dial the telephone number as specified in the "Contact Us" parameter 225 in FIG. 2C to connect the user to a human agent or another voice site. The "Help" checkbox 314h allows a "Help" button to be displayed on the communications device 110 if the interaction is visual. If the user clicks on the "Help" button during a visual interaction with the voice page, the communications device 110 may open a web site as specified in the "Help URL" parameter 224 in FIG. 2C to connect the user to a help web site. The examples describe above for configuring the visual interaction are not limiting. A GUI for developing an interaction page used in a VIVR communications environment may have more or fewer configurable parameters than the GUI 311 described in FIG. 3B.

Figure 3C:
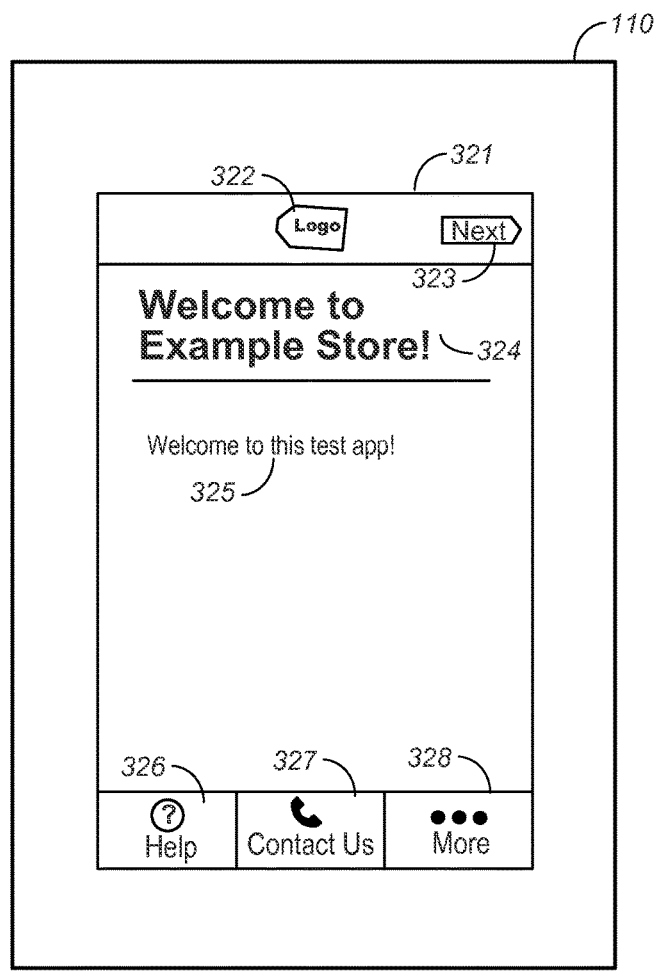
FIG. 3C illustrates a rendered message page in a visual-IVR application.

FIG. 3C illustrates an example GUI 321 that is displayed on a communications device 110 during a visual interaction with the first page of the VIVR-enabled voice site. In some implementations, the example GUI 321 may be displayed using a web browser running on the communications device 110. In some implementations, the example GUI 321 may be displayed using a third-party mobile application running on the communications device 110. In some implementations, the arrangement of the displayed information may be defined by scripts or codes received from the call handling system 150. For example, the arrangement of the displayed information may be defined using HTML5 codes transmitted from the application server 140 to the communications device 110, which allows flexibility for how the information is being displayed according to parameters such as device types, device screen size, user profiles, and/or other variable parameters.

In some implementations, the example GUI 321 may display information that is common as the audio information provided to a user during a voice interaction with the first page of the VIVR-enabled voice site. For example, the main text 325 "Welcome to this test app!" is displayed on the communications device 110, which corresponds to the information specified by the content provider in the "Initial Prompts" field 304c in FIG. 3A.

In some implementations, the example GUI 321 may display information that is only applicable for a visual interaction with the first page of the VIVR-enabled voice site. For example, a logo 322 is displayed on the communications device 110, which corresponds to the "Logo" parameter 226 as illustrated in FIG. 2C. As another example, a "Next" button 323 is displayed on the communications device 110, which corresponds to the selection of the "Next" parameter 314e as illustrated in FIG. 3B. As another example, a title text 324 of "Welcome to Example Store" is displayed on the communications device 110, which corresponds to the text entered in the "Title" parameter 314c as illustrated in FIG. 3B. As another example, a "Help" button 326 is displayed on the communications device 110, which corresponds to the selection of the "Help" parameter 314h as illustrated in FIG. 3B. As another example, a "Contact Us" button 327 is displayed on the communications device 110, which corresponds to the selection of the "Call" parameter 314g as illustrated in FIG. 3B.

FIG. 4A illustrates an example GUI 401 for configuring an interaction page (specifically, a question page) that is the second page that is processed for the interaction site. The "Account" interaction page is identified by its page name 402 and/or page number 403. The main tab 404a of the interaction page allows the content provider to enter parameters that configure the interaction page for the IVR channel. The question that is asked is specified by the content provider using the "Initial Prompts" parameter 404b. The response received from the caller is processed based on the "Response Type" 405a specified by the content provider and is stored in a variable 405b.

In some implementations, some of these parameters in the GUI 401 are common for both voice and visual interactions. For example, the "Initial Prompts" parameter 404b allows the content provider to enter information that will be presented to the user independent of how the user accesses the VIVR-enabled voice site. As another example, the Response Type 405a is also common for both voice and visual interactions. Here, the Response Type 405a is set to "Yes/No", where the call handling system 150 expects a Yes or No response from a user accessing this voice page independent of whether the interaction is visual or voice. As another example, the next page parameter 404d is also common for both voice and visual interactions. The next page parameter 404d includes two pull-down menus that allows the content provider to specify which page is to be provided to the user after the user provides a feedback.

The examples describe above for the IVR channel are not limiting. A GUI for developing an interaction page used in an IVR communications environment may have more or fewer configurable parameters than the GUI 401 described in FIG. 4A.

Figure 4B:
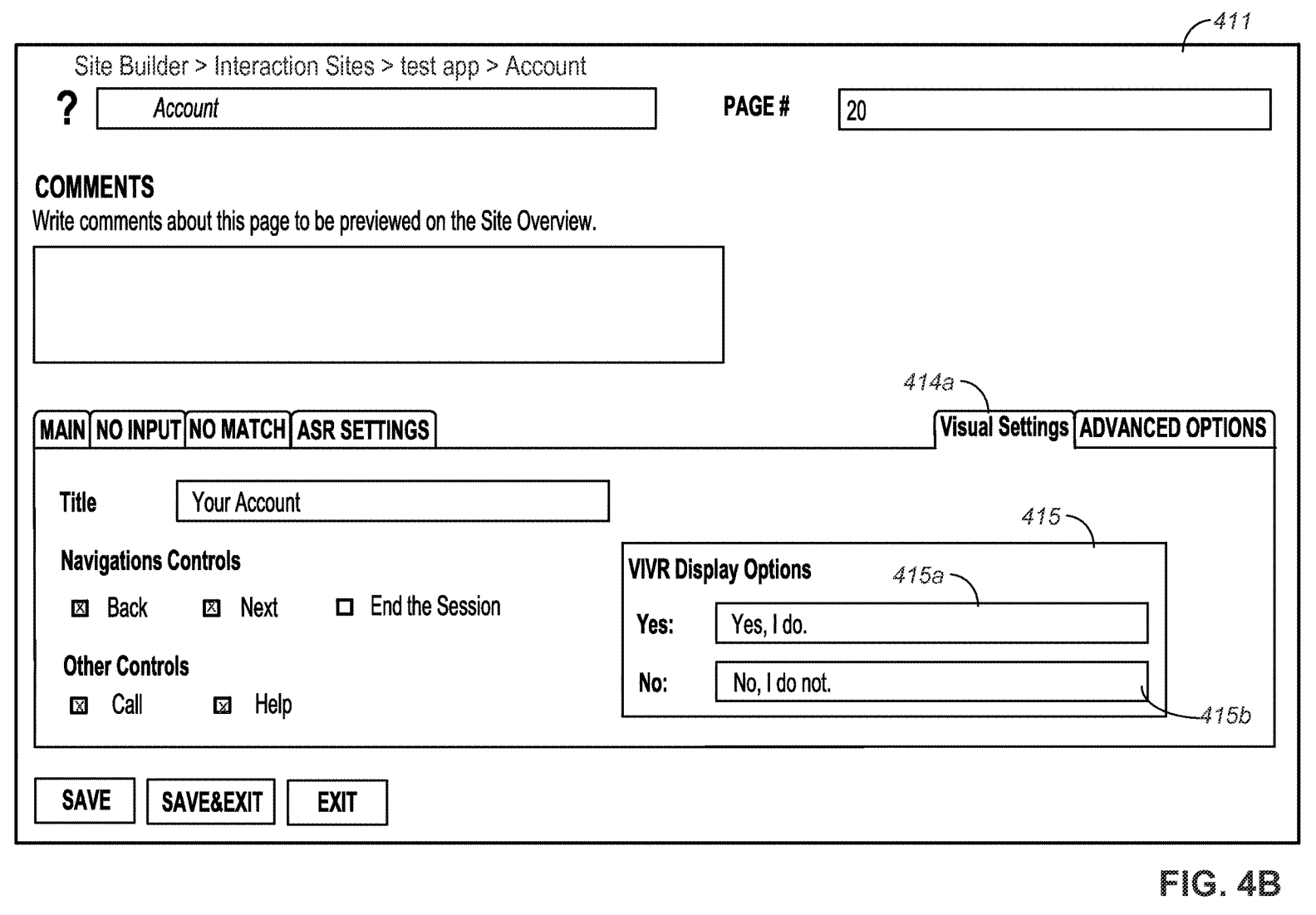

FIG. 4B illustrates an example GUI 411 for configuring parameters associated with a visual interaction of the second page that is processed for the interaction site in the event that the user initiates a visual interaction with the interaction site. The Visual Settings tab 414a of the interaction page allows the content provider to enter values for parameters associated the visual interaction. These parameters will not be processed if the user access the interaction site through a voice interaction. The "Title", "Navigations Controls", and "Other Controls" parameters are similar to those described in FIG. 3B and will not be repeated here. The "VIVR Display Option" 415 is shown in the GUI 411 in response to the content provider selecting the Response Type 405a to "Yes/No." The "VIVR Display Option" 415 allows the content provider to input additional text in fields 415a and 415b to be displayed to a user to further clarify the Yes/No choices during a visual interaction.

The examples describe above for configuring the visual interaction are not limiting. A GUI for developing an interaction page used in a VIVR communications environment may have more or fewer configurable parameters than the GUI 411 described in FIG. 4B.

Figure 4C:
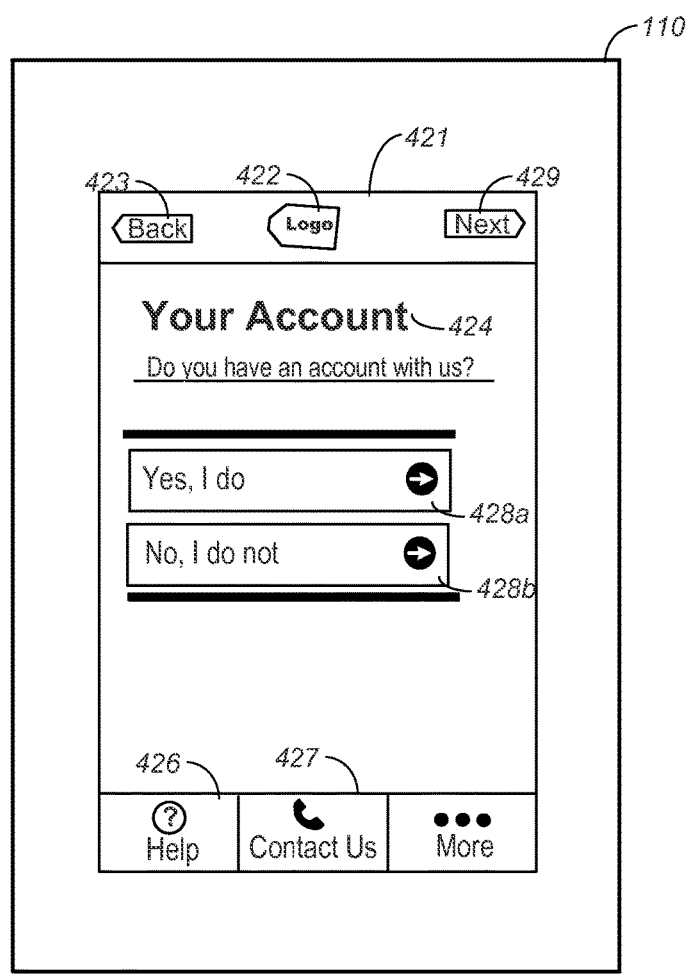
FIGS. 4C, 5C, 6C, and 7-10 illustrate rendered question pages in a visual-IVR application.

FIG. 4C illustrates an example GUI 421 that is displayed on a communications device 110 during a visual interaction with the second page of the VIVR-enabled voice site. In some implementations, the arrangement of the displayed information may be defined by scripts or codes received from the call handling system 150. For example, the arrangement of the displayed information may be defined using HTML5 codes transmitted from the application server 140 to the communications device 110. In some implementations, the arrangement of the displayed information is defined by parameters such as the page type, the response type, and the Visual Settings options selected by the content provider. For example, the arrangement of the displayed information in GUI 421 is defined by the page type being a question page, the response type being a "Yes/No" type, and the selection of parameters in the Visual Settings tab 414a in FIG. 4B.

In some implementations, the example GUI 421 may display information that is common as the audio information provided to a user during a voice interaction with the corresponding voice page of the VIVR-enabled voice site. In some implementations, the example GUI 421 may display information that is only applicable for a visual interaction with the corresponding voice page of the VIVR-enabled voice site. For example, a logo 422 is displayed on the communications device 110, which corresponds to the "Logo" parameter 226 as illustrated in FIG. 2C. As another example, a "Next" button 429, a "Back button" 423, a title text 424, a "Help" button 426, a "Contact Us" button 427 are displayed on the communications device 110, which corresponds to the selections as illustrated in FIG. 4B. As another example, a text 428a of "Yes, I do" is displayed on the communications device 110, which corresponds to the text entered in the "Yes" parameter 415a as illustrated in FIG. 4B. As another example, a text 428b of "No, I do not" is displayed on the communications device 110, which corresponds to the text entered in the "No" parameter 415b as illustrated in FIG. 4B. After the user makes a selection, the user can click on the "Next" button 429, where a value corresponding to the selection is stored to a corresponding variable, transmitted to the call handling system 150, and processed by the VIVR system 152 in a same manner that a response from a voice interaction would be processed.

FIG. 5A illustrates an example GUI 501 for configuring an interaction page (specifically, a question page) that corresponds to page number 30 of the interaction site. The "Account Number" interaction page is identified by its page name 502 and/or page number 503. In some implementations, some of these parameters in the GUI 501 are common for both voice and visual interactions. For example, the "Initial Prompts" parameter 504b allows the content provider to enter information that will be presented to the user independent of how the user accesses the VIVR-enabled voice site. As another example, the Response Type 505a is also common for both voice and visual interactions. Here, the Response Type 505a is set to "Number", where the call handling system 150 expects a numeric response from a user accessing this voice page independent of whether the interaction is visual or voice. As another example, the next page parameter 504d is also common for both voice and visual interactions.

The examples describe above for the IVR channel are not limiting. A GUI for developing an interaction page used in an IVR communications environment may have more or fewer configurable parameters than the GUI 50I described in FIG. 5A.

FIG. 5B illustrates an example GUI 511 for configuring parameters associated with a visual interaction of interaction page that corresponds to page number 30 of the interaction site in the event that the user initiates a visual interaction with the interaction site. The Visual Settings tab 514a of the interaction page allows the content provider to enter values for parameters associated the visual interaction. These parameters will not be processed if the user access the interaction site through a voice interaction. The "Title", "Navigations Controls", and "Other Controls" parameters are similar to those described in FIG. 3B and will not be repeated here. Unlike FIG. 4B, the GUI 511 does not include the "VIVR Display Option" parameter because the content provider selecting the Response Type 505a to "Number." The examples describe above for configuring the visual interaction are not limiting. A GUI for developing an interaction page used in a VIVR communications environment may have more or fewer configurable parameters than the GUI 511 described in FIG. 5B.

Figure 5C:
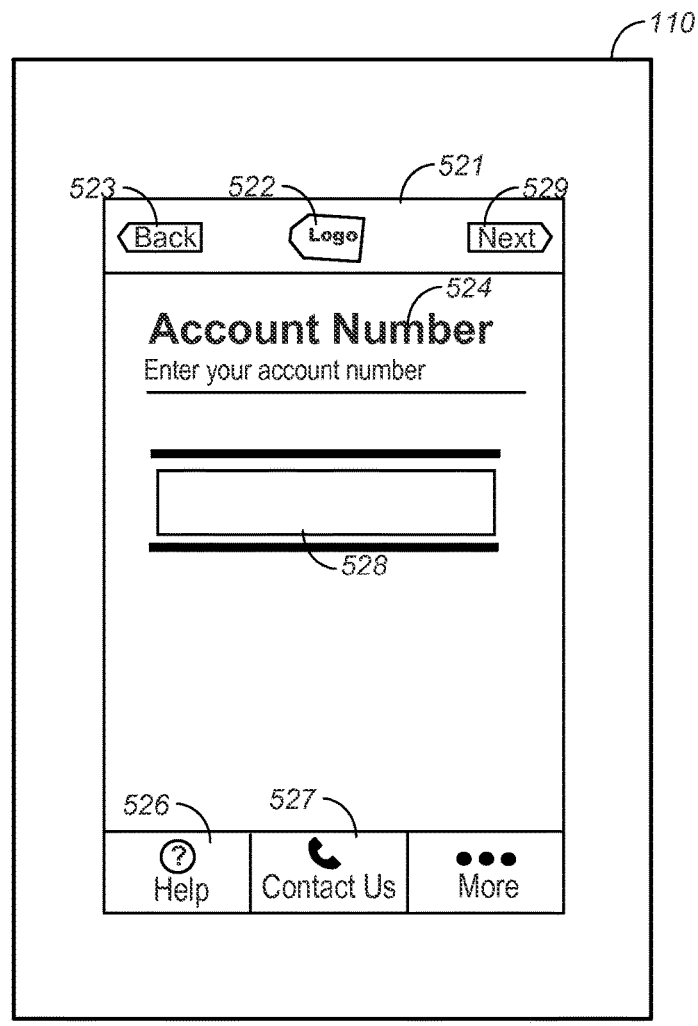

FIG. 5C illustrates an example GUI 521 that is displayed on a communications device 110 during a visual interaction with the voice page number 30 of the VIVR-enabled voice site. In some implementations, the arrangement of the displayed information may be defined by scripts or codes received from the call handling system 150. For example, the arrangement of the displayed information may be defined using HTML5 codes transmitted from the application server 140 to the communications device 110. In some implementations, the arrangement of the displayed information is defined by parameters such as the page type, the response type, and the Visual Settings options selected by the content provider. For example, the arrangement of the displayed information in GUI 521 is defined by the page type being a question page, the response type being a "Number" type, and the selection of parameters in the Visual Settings tab 514a in FIG. 5B.

In some implementations, the example GUI 521 may display information that is common as the audio information provided to a user during a voice interaction with the corresponding voice page of the VIVR-enabled voice site. In some implementations, the example GUI 521 may display information that is only applicable for a visual interaction with the corresponding voice page of the VIVR-enabled voice site. For example, a logo 522 is displayed on the communications device 110, which corresponds to the "Logo" parameter 226 as illustrated in FIG. 2C. As another example, a "Next" button 529, a "Back button" 523, a title text 524, a "Help" button 526, a "Contact Us" button 527 are displayed on the communications device 110, which corresponds to the selections as illustrated in FIG. 5B. As another example, a text field 528 is displayed on the communications device 110, which allows the user to input numerical values that corresponds to an account number. After the user is finished entering the account number, the user can click on the "Next" button 529, where the input numerical values are stored in a corresponding variable, transmitted to the call handling system 150, and processed by the VIVR system 152 in a same manner that a response from a voice interaction would be processed.

FIG. 6A illustrates an example GUI 601 for configuring an interaction page (specifically, a question page) that corresponds to page number 50 of the interaction site. The "Main Select" interaction page is identified by its page name 602 and/or page number 603. In some implementations, some of these parameters in the GUI 601 are common for both voice and visual interactions. For example, the "Initial Prompts" parameter 604b allows the content provider to enter information that will be presented to the user independent of how the user accesses the VIVR-enabled voice site. As another example, the Response Type 605a is also common for both voice and visual interactions. Here, the Response Type 605a is set to "Keyword", where the call handling system 150 expects a keyword from one or more predefined keywords 631a, 631b, and 631c, independent of whether the interaction is visual or voice. As another example, the next page parameter 604d that corresponds to a selection by the user is also common for both voice and visual interactions.

The examples describe above for the IVR channel are not limiting. A GUI for developing an interaction page used in an IVR communications environment may have more or fewer configurable parameters than the GUI 601 described in FIG. 6A.

FIG. 6B illustrates an example GUI 611 for configuring parameters associated with a visual interaction of interaction page that corresponds to page number 50 of the interaction site in the event that the user initiates a visual interaction with the interaction site. The Visual Settings tab 614a of the interaction page allows the content provider to enter values for parameters associated the visual interaction. These parameters will not be processed if the user access the interaction site through a voice interaction. The "Title", "Navigations Controls", and "Other Controls" parameters are similar to those described in FIG. 3B and will not be repeated here. The "VIVR Display Options" 615 is shown in the GUI 611 in response to the content provider selecting the Response Type 605a to "Keyword." The "VIVR Display Option" 615 allows the content provider to select from a menu of options that controls the manners the keywords are to be displayed to a user during a visual interaction. Example options may include "Click to continue," "Checkboxes," and "Radio buttons." Here, the option "Click to continue" is chosen by the content provider, which would allow the user to select one keyword from the list of predetermined keywords 631a, 631b, and 631c, as defined in FIG. 6A. The examples describe above for configuring the visual interaction are not limiting. A GUI for developing an interaction page used in a VIVR communications environment may have more or fewer configurable parameters than the GUI 611 described in FIG. 6B.

Figure 6C:
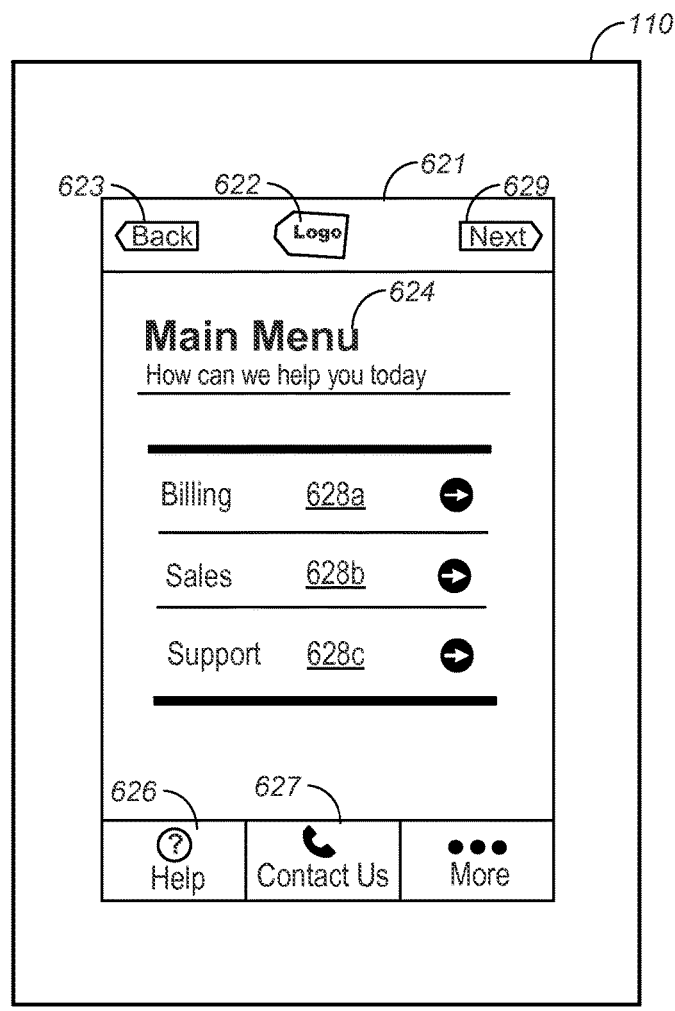

FIG. 6C illustrates an example GUI 621 that is displayed on a communications device 110 during a visual interaction with the voice page number 50 of the VIVR-enabled voice site. In some implementations, the arrangement of the displayed information may be defined by scripts or codes received from the call handling system 150. For example, the arrangement of the displayed information may be defined using HTML5 codes transmitted from the application server 140 to the communications device 110. In some implementations, the arrangement of the displayed information is defined by parameters such as the page type, the response type, and the Visual Settings options selected by the content provider. For example, the arrangement of the displayed information in GUI 621 is defined by the page type being a question page, the response type being a "Keyword" type, and the selection of parameters in the Visual Settings tab 614a in FIG. 6B.

In some implementations, the example GUI 621 may display information that is common as the audio information provided to a user during a voice interaction with the corresponding voice page of the VIVR-enabled voice site. In some implementations, the example GUI 621 may display information that is only applicable for a visual interaction with the corresponding voice page of the VIVR-enabled voice site. For example, a logo 622 is displayed on the communications device 110, which corresponds to the "Logo" parameter 226 as illustrated in FIG. 2C. As another example, a "Next" button 629, a "Back button" 623, a title text 624, a "Help" button 626, a "Contact Us" button 627 are displayed on the communications device 110, which corresponds to the selections as illustrated in FIG. 6B. As another example, a list of keyword selections 628a, 628b, and 628c are displayed on the communications device 110, which allows the user to select one keyword from the list of keyword selections 628a, 628b, and 628c. After the user is finished selecting the keyword, the user can click on the "Next" button 629, where the value corresponding to the selected keyword is stored in a corresponding variable, transmitted to the call handling system 150, and processed by the VIVR system 152 in a same manner that a response from a voice interaction would be processed.

Figure 7:
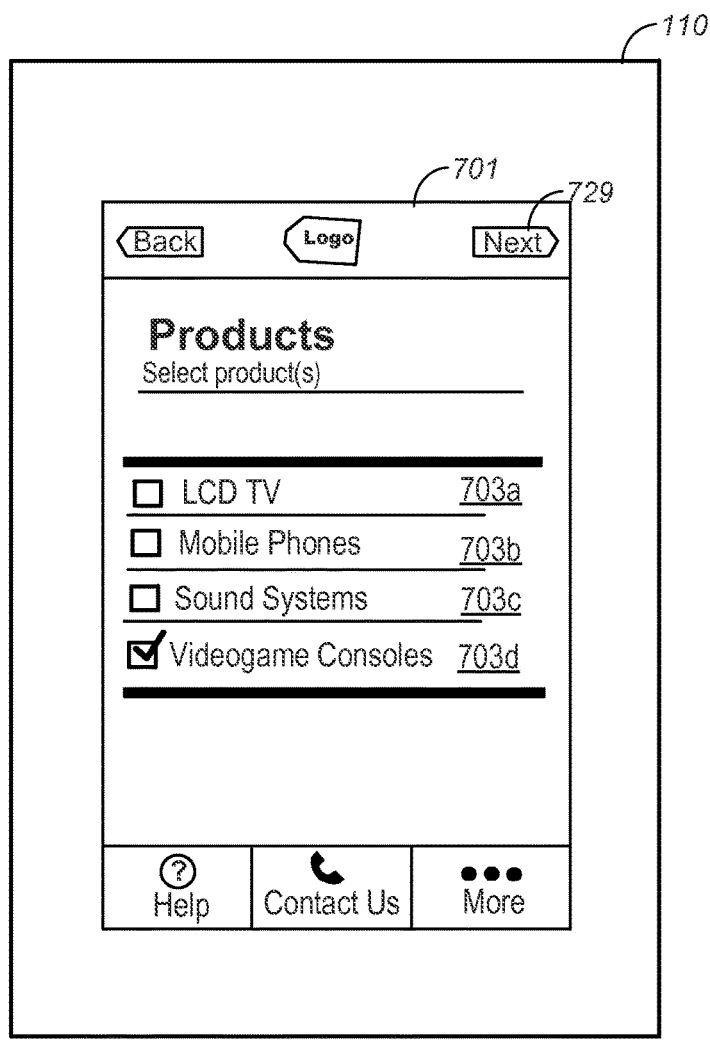

FIGS. 7-10 show additional example question voice pages with various response types that are rendered and displayed on a communications device, to illustrate the design flexibility of VIVR applications. FIG. 7 shows a GUI 701 that is displayed on a communications device 110 during a visual interaction with a question voice page assigned with a response type of "multiple selections." A list of keyword selections 703a, 703b, 703c, and 703d are displayed on the communications device 110, which allows the user to select one or more keywords from the list of keyword selections 703a, 703b, 703c, and 703d by clicking on the corresponding checkboxes. After the user is finished selecting the keyword, the user can click on the "Next" button 729, where the value(s) corresponding to the selected keyword(s) is stored in one or more corresponding variables, transmitted to the call handling system 150, and processed by the VIVR system 152 in a same manner that a response from a voice interaction would be processed.

Figure 8:
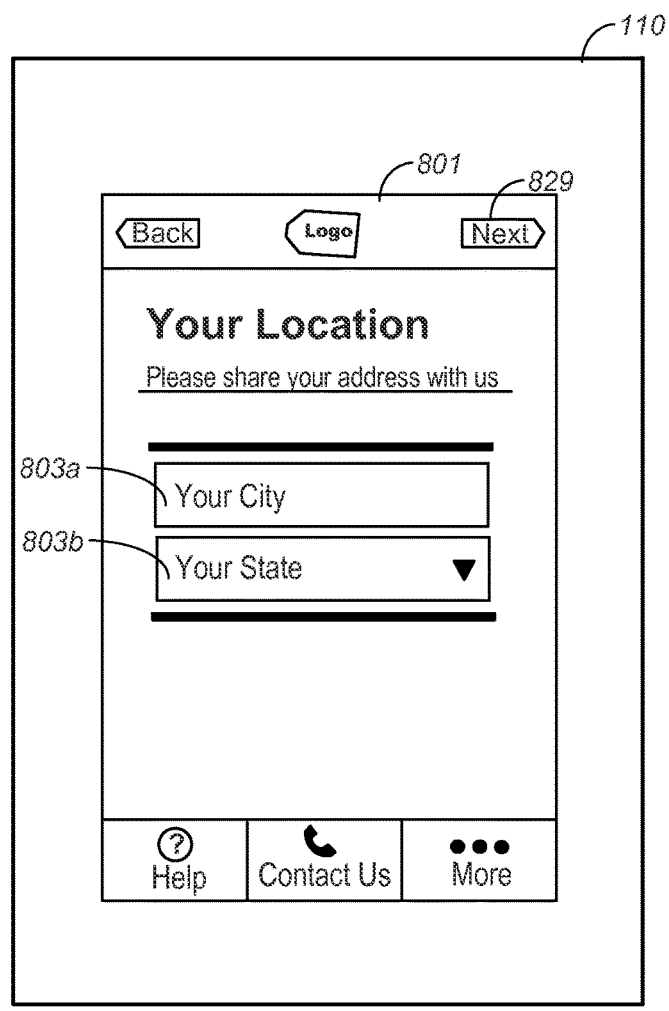

FIG. 8 shows a GUI 801 that is displayed on a communications device 110 during a visual interaction with a question voice page assigned with a response type of "location." A text field 803a and a menu 803b are displayed on the communications device 110, which allows the user to input location information. After the user is finished inputting the location information, the user can click on the "Next" button 829, where the value corresponding to the input location information is stored in a corresponding variable, transmitted to the call handling system 150, and processed by the VIVR system 152 in a same manner that a response from a voice interaction would be processed.

Figure 9:
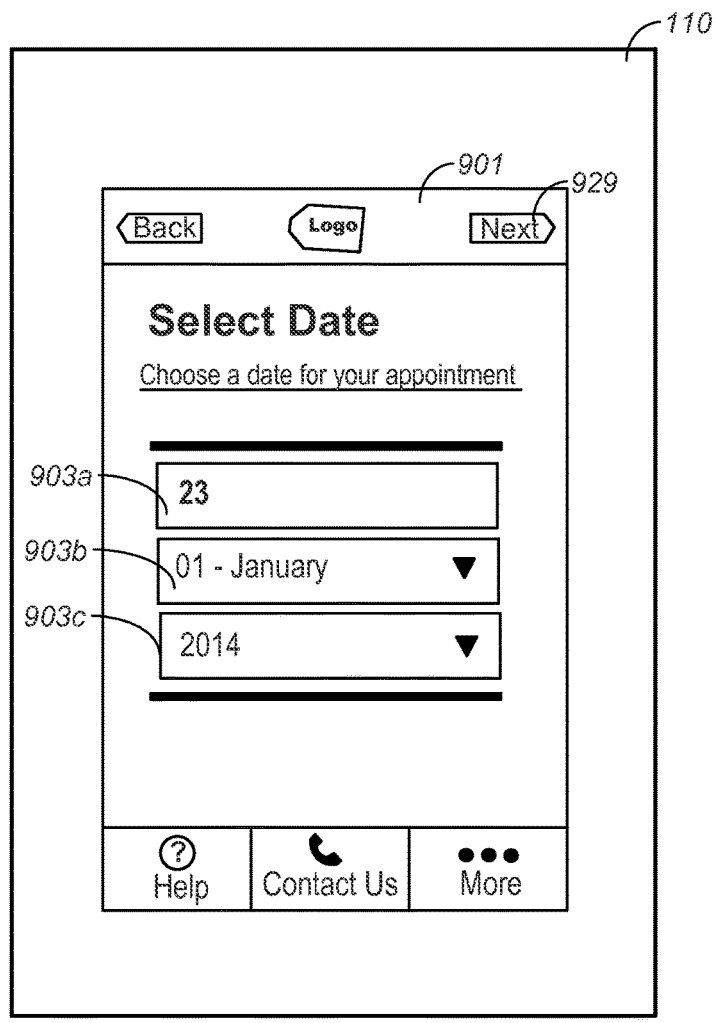

FIG. 9 shows a GUI 901 that is displayed on a communications device 110 during a visual interaction with a question voice page assigned with a response type of "calendar." A day field 903a and month and year menus 903b and 903c are displayed on the communications device 110, which allows the user to input calendar information. After the user is finished inputting the calendar information, the user can click on the "Next" button 929, where the value corresponding to the input calendar information is stored in a corresponding variable, transmitted to the call handling system 150, and processed by the VIVR system 152 in a same manner that a response from a voice interaction would be processed.

Figure 10:
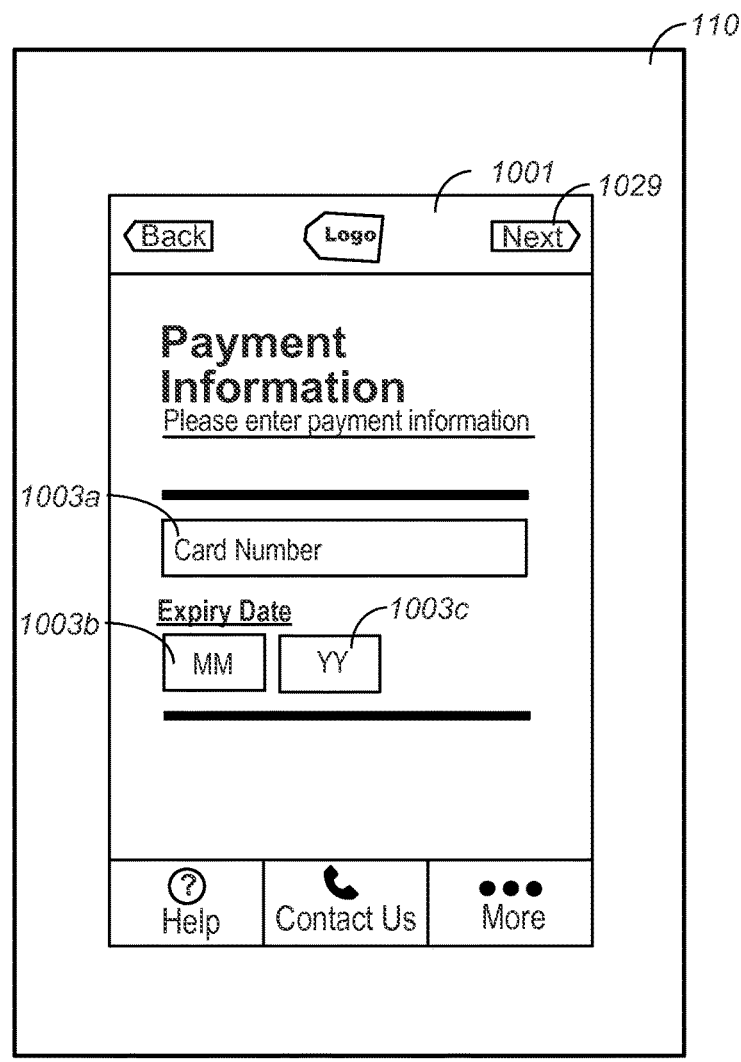

FIG. 10 shows a GUI 1001 that is displayed on a communications device 110 during a visual interaction with a question voice page assigned with a response type of "calendar." A "Card Number" field 1003a and "Expiration Month" and "Expiration Year" menus 1003b and 1003c are displayed on the communications device 110, which allows the user to input payment information. After the user is finished inputting the calendar information, the user can click on the "Next" button 1029, where the value corresponding to the input payment information is stored in a corresponding variable, transmitted to the call handling system 150, and processed by the VIVR system 152 in a same manner that a response from a voice interaction would be processed.

Figure 11:
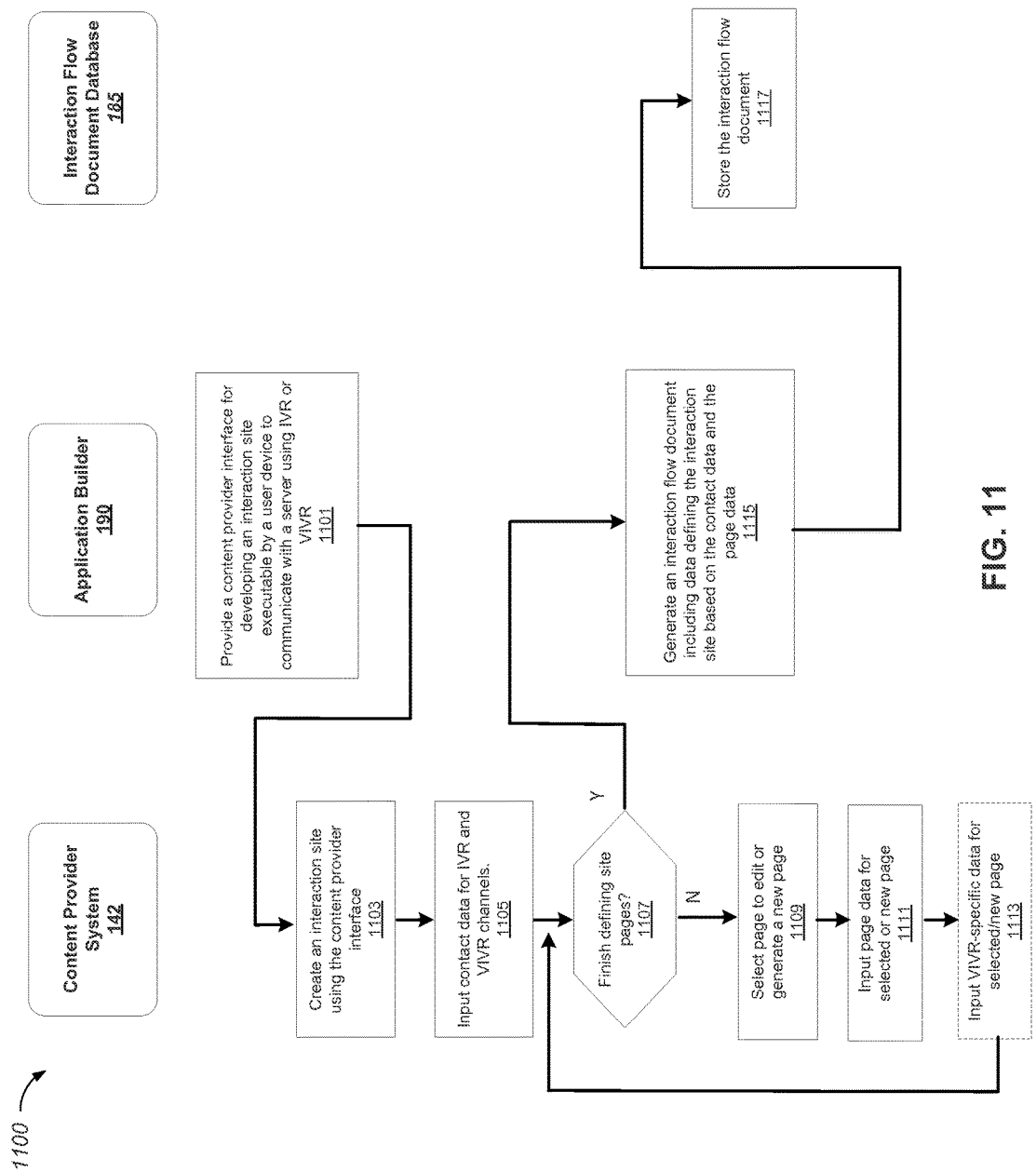
FIG. 11 is a flow chart illustrating an example of a process for a content provider to create and host a visual-IVR enabled interaction site.

FIG. 11 is a flow chart illustrating an example of a process 1100 for a content provider to create and host a VIVR-enabled interaction site. In general, the process 1100 provides a content provider an interface to design and create an interaction site that may be accessed in a multi-channel solution platform. The process 1100 is described as being performed by a computer system comprising one or more computers, for example, the content provider system 142 shown in FIG. 1.

The application builder 190 provides to the content provider system 142 a content provider interface for developing an interaction site executable by a user device to communicate with a server using any one of multiple communications channels (1101).

The content provider system 142 creates a VIVR-enabled interaction site using the content provider interface (1103). The application builder 190 may include a content provider interface 192. The content provider interface 192 is a GUI front-end for an application development tool that can be used to build an interaction site that is capable of handling interactions using multiple communications channels. The content provider may access the content provider interface 192 over the network 130. For example, the application builder 190 may provide a GUI similar to the GUI 204 in FIG. 2B, which allows the content provider to enable voice IVR and/or visual IVR for an interaction site.

The content provider system 142 inputs contact data for each of the enabled IVRs (1105). For example, the application builder 190 may provide a GUI similar to the GUI 204 in FIG. 2B, which allows the content provider to define the contact information for an interaction site. The content provider may enable the type of IVR the users may use to access the interaction site by checking or unchecking the checkbox associated with the IVR type. The content provider may select one or more IVR type that the interaction site will support, and, for each of the selected IVR type, the content provider may enter corresponding contact information to associate the contact information with the interaction site. For the Voice IVR, the content provider may enter a Phone Number. For the Visual IVR, the content provider may enter a URL.

The content provider system 142 determines whether the content provider has finished defining pages of the interaction site (1107). For example, the application builder 190 may provide a GUI similar to the GUI 201 in FIG. 2A, which allows the content provider to add, edit, or remove one or more pages of an interaction site. The pages may include, for example, any or all of the previously mentioned pages, including message pages, question pages, logic pages, and transaction pages. Examples of other page types that may be used for the interaction site include call queue pages, which are configured to interact with external data sources in order to pull or push relevant data and call transfer pages, which are configured to transfer the call to designated contact point (e.g., phone number). If the content provider has not finished defining the pages of the interaction site, the content provider selects a page from among the site's existing pages to edit (e.g., by modifying the page or deleting the page) or generates a new page (1109).

The content provider inputs page data for the selected or new page (1111). For example, the application builder 190 may provide a GUI similar to the GUI 301 in FIG. 3A for configuring an interaction page that is the first page processed for the interaction site for an IVR channel. Some of the input parameters are common for both voice and visual interactions, while some of the input parameters are specific for either the voice or the visual interaction. Optionally, the content provider inputs visual-interaction-specific data for the selected or new page (1113). For example, the application builder 190 may provide a GUI similar to the GUI 311 in FIG. 3B that are specific for visual interactions for the IVR channel.

If the content provider has finished defining the pages of the interaction site, the application builder 190 generates an interaction flow document including data defining the interaction site based on the contact data and the page data (1115). In some implementations, the application builder 190 may generate an interaction flow document, which may include XML scripts that correspond to pages (e.g., interaction pages) of an interaction site created by the content provider via the content provider interface.

The application builder 190 then stores the interaction flow document at the interaction flow document database 185 (1117). The interaction flow document database 185 stores interaction flow documents created by the application builder 190, and provides the interaction flow processor 180 access to these interaction flow documents.

FIG. 12 is a flow chart illustrating an example of a process 1200 for a user to communicate with a call handling system and access an VIVR-enabled interaction site. In general, the process 1200 provides a communications device access to an interaction site to communicate with a VIVR system using either a voice interaction or a visual interaction. The process 1200 is described as being performed by a computer system comprising one or more computers, for example, the communications system 100 shown in FIG. 1

The communications device 110 sends a request to access an interaction site using either a voice interaction or a visual interaction (1201). A user of the communications device (e.g., a smart phone) 110 is able to interact with the communications device 110 to request a service from an interaction site that is provided by a content provider. For example, the user may indicate a desire to request a service by contacting the call handling system 150 in either of two ways. For example, a user may access a VIVR-enabled voice site by calling a telephone number associated with the voice site. As another example, the user may access the same voice site visually using an application by entering a URL associated with the voice site on the communications device.

The call handling system 150 receives the request from communications device 110, and sends a request to the interaction flow processor 180 to obtain code for initiating the interaction site (1203). For example, if the user of the communications device 110 calls a phone number to reach the interaction site, the call handling system 150 will receive the phone call. Based on the contact information received by the call handling system 150, the call handling system 150 sends a request to the interaction flow processor 180 for the scripts for executing the voice site. The request sent by the call handling system 150 to the interaction flow processor 180 may include an interaction site identifier (e.g., a unique interaction site identifier) that may be used by the interaction flow processor 180 to identify the desired interaction site. In some implementations, the call handling system 150 may send a request for the scripts for executing the entire flow of the interaction site. In other implementations, the call handling system 150 may send a request for the scripts for executing a particular state of the flow (e.g., a state corresponding to executing a single page or executing a subset of the pages of the interaction site), rather than the entire flow.

The interaction flow processor 180 identifies the communications channel used by the user to contact the system (1205). In some implementations, the communications channel may be included in the request sent by a multi-channel communications system. In some implementations, the communications channel may be determined by the interaction flow processor 180 based on the identifier of the handling system. For example, the identifier may be an IP address of the handling system. As another example, the identifier may be metadata embedded in the request to the interaction flow processor 180.

The interaction flow processor 180 accesses the interaction flow document for the interaction site (1207). Based on the interaction site that the call handling system 150 has requested, the interaction flow processor 180 accesses the interaction flow document stored in the interaction flow document database 185. The interaction flow document database 185 then provides the common code for the interaction site (1209). In some implementations, the common code may be XML scripts. For example, the common code may be SCXML scripts.

The interaction flow processor 180 translates the common code to code specific to the IVR channel (1211). For example, given the handling system is the call handling system 150, the interaction flow processor 180 translates the scripts from XML scripts to VoiceXML scripts. In some implementations, the translation may include adding parameters specific to a type of communications channel in the translated scripts. For example, given the handling system is the call handling system 150, the interaction flow processor 180 may add information specific to ASR resource selection in the translated scripts. The interaction flow processor 180 then transmits the translated code that is specific to the IVR channel to the call handling system 150 (1213).

The call handling system 150 determines whether the request from the communications device 110 is for a standard IVR or for a visual IVR application (1214). In some implementations, the request from the communications system is received by the application server 140. For example, the application server 140 may determine that the request is for a standard IVR if the request is received via a voice channel. The application server 140 may determine that the request is for a visual IVR if the request is received via a data channel. As another example, the application server 140 may receive the request from a data channel, but may determine that the request is for a standard IVR if metadata associated with the request indicates that the request is a voice communication. In some implementations, after the application server 140 determines whether the request is for a visual IVR or for a voice IVR, the application server 140 may send an updated request to the VIVR system 152, where the updated request includes an indication of the determination.

The call handling system 150 executes code specific to the determined type of IVR communications to initiate the interaction site between the call handling system 150 and the communications device 110 (1215). The communications device 110 then interacts with the interaction site via the communications channel (1217). In some implementations, the VIVR system 152 processes a visual interaction in a same manner as processing a voice interaction. In some implementations, in response to determining that the request from the communications device 110 is for the visual-version of the voice site, the application server 140 may translate the voice messages from the VIVR system 152 into corresponding messages in a different scripting or programming language (e.g., HTML5), so the corresponding messages may be displayed on the communications device 110. In some implementations, the call handling system 150 may store interaction data in the data store 160, including data indicating whether the interaction is visual or voice.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A system may encompass all apparatus, devices, and machines for processing data, including by way of example a programmable processor, a computer, or multiple processors or computers. A system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communications network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. For example, a communications channel may include the Web, where a user may interact with an interaction site via a webpage generated dynamically according to the interaction flow. As another example, a communications channel may include a smart phone application, where a user may interact with an interaction site by starting a smart phone application, and the smart phone application then contacts the interaction site and provides a communications interface between the user and the interaction site. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method, comprising:
  receiving, by a server and from a communications device, a request for interaction;
  identifying, by the server, a common interaction flow document including first instructions that, when executed, provide one or more steps of a multi-step communication flow between the communications device and an automated response module, wherein the common interaction flow document is for handling interactions received over different channels including voice interactions and visual interactions;
  determining, by the server, whether the interaction is for a voice-interaction or a visual-interaction
  in response to determining that the interaction is for the voice-interaction:
    retrieving the common interaction flow document;
    translating, by the server, the first instructions into second instructions, wherein the second instructions, when executed by the communications device, provide the one or more steps through a voice interaction with a user of the communications device; and
    transmitting, from the server and to the communications device, the second instructions; and
  in response to determining that the interaction is for the visual-interaction:
    retrieving the common interaction flow document;
    translating, by the server, the first instructions into third instructions, wherein the third instructions, when executed by the communications device, provide the one or more steps through a visual interaction with the user of the communications device; and
    transmitting, from the server and to the communications device, the third instructions.

2. The method of claim 1, wherein the request for interaction indicates whether the request from the communications device is for the voice-interaction or the visual-interaction.

3. The method of claim 1, wherein determining whether the request from the communications device is for the voice-interaction or the visual-interaction comprises:
  determining whether the request is received from a voice channel or a data channel;
  in response to determining that the request is received from the voice channel, determining that the request is for the voice-interaction; and
  in response to determining that the request is received from the data channel, determining that the request is for the visual-interaction.

4. The method of claim 1, wherein determining whether the request from the communications device is for the voice-interaction or the visual-interaction comprises:
  determining that the request is based on hypertext markup language (HTML); and
  in response to determining that the request is based on HTML, determining that the request from the communications device is for the visual-interaction.

5. The method of claim 1, further comprising storing data representing a communication between the communications device and the automated response system, the data including an indication of whether the communication is visual.

6. The method of claim 1 further comprising retrieving, by the server, one or more interaction pages in response to the request, wherein each interaction page represents a respective step of the multi-step communication flow, and wherein the one or more interaction pages are configured by a user of a content provider device through interactions with a development interface to include values for (i) one or more parameters associated with the voice-interaction, (ii) one or more parameters associated with the visual-interaction, and (iii) one or more parameters associated with both the voice-interaction and the visual-interaction.

7. The method of claim 6, wherein the second instructions do not include instructions generated using the values for the one or more parameters associated with the visual-interaction, and wherein the third instructions do not include instructions generated using the values for the one or more parameters associated with the voice-interaction.

8. The method of claim 1, wherein the first instructions are based on state chart extensible markup language (SCXML), wherein the second instructions are based on voice extensible markup language (VoiceXML), and wherein the third instructions are based on HTML5.

9. The method of claim 1, wherein the first instructions and the second instructions are based on VoiceXML, and wherein the third instructions are based on HTML5.

10. The method of claim 1, wherein the automated response system is an interactive voice response system.

11. A system, comprising:
one or more processors and one or more non-transitory computer-readable storage devices storing instructions that when executed by the one or more processors cause the one or more processors to respectively perform operations comprising:
receiving, from a communications device, a request for interaction;
identifying a common interaction flow document including first instructions that, when executed, provide one or more steps of a multi-step communication flow between the communications device and an automated response module, wherein the common interaction flow document is for handling interactions received over different channels including voice interactions and visual interactions;
determining whether the interaction is for a voice-interaction or a visual-interaction;
in response to determining that the interaction is for the voice-interaction:
retrieving the common interaction flow document;
translating the first instructions into second instructions wherein the second instructions, when executed by the communications device, provide the one or more steps through a voice interaction with a user of the communications device; and
transmitting, to the communications device, the second instructions; and
in response to determining that the interaction is for the visual-interaction with the interaction site:
retrieving the common interaction flow document;
translating the first instructions into third instructions, wherein the third instructions, when executed by the communications device, provide the one or more steps through a visual interaction with the user of the communications device; and
transmitting, to the communications device, the third instructions.

12. The system of claim 11, wherein the request for interaction indicates whether the request from the communications device is for the voice-interaction or the visual-interaction.

13. The system of claim 11, wherein determining whether the request from the communications device is for the voice-interaction or the visual-interaction-comprises:
determining whether the request is received from a voice channel or a data channel;
in response to determining that the request is received from the voice channel, determining that the request is for the voice-interaction; and
in response to determining that the request is received from the data channel, determining that the request is for the visual-interaction.

14. The system of claim 11, wherein determining whether the request from the communications device is for the voice-interaction or the visual-interaction comprises:
determining that the request is based on hypertext markup language (HTML); and
in response to determining that the request is based on HTML, determining that the request from the communications device is for the visual-interaction.

15. The system of claim 11, wherein the operations further comprise storing data representing a communication between the communications device and the automated response system, the data including an indication of whether the communication is visual.

16. The system of claim 11, wherein the operations further comprise retrieving one or more interaction pages in response to the request, wherein each interaction page represents a respective step of the multi-step communication flow, and wherein the one or more interaction pages are configured by a user of a content provider device through interactions with a development interface to include values for (i) one or more parameters associated with the voice-interaction, (ii) one or more parameters associated with the visual-interaction, and (iii) one or more parameters associated with both the voice-interaction and the visual-interaction.

17. The system of claim 16, wherein the second instructions do not include instructions generated using the values for the one or more parameters associated with the visual-interaction, and wherein the third instructions do not include instructions generated using the values for the one or more parameters associated with the voice-interaction.

18. The system of claim 11, wherein the first instructions are based on state chart extensible markup language (SCXML), wherein the second instructions are based on voice extensible markup language (VoiceXML), and wherein the third instructions are based on HTML5.

19. The system of claim 11, wherein the first instructions and the second instructions are based on VoiceXML, and wherein the third instructions are based on HTML5.

20. A non-transitory computer-readable storage device storing instructions that when executed by one or more processors, cause the one or more processors to perform operations comprising:
receiving, from a communications device, a request for interaction;
identifying a common interaction flow document including first instructions that, when executed, provide one or more steps of a multi-step communication flow between the communications device and an automated response module, wherein the common interaction flow document is for handling interactions received over different channels including voice interactions and visual interactions;
determining whether the interaction is for a voice-interaction or a visual-interaction;
in response to determining that the interaction is for the voice-interaction:
retrieving the common interaction flow document;
translating the first instructions into second instructions, wherein the second instructions, when executed by the communications device, provide the one or more steps through a voice interaction with a user of the communications device; and
transmitting, to the communications device, the second instructions; and
in response to determining that the interaction is for the visual-interaction:

retrieving the common interaction flow document;

translating the first instructions into third instructions wherein the third instructions, when executed by the communications device, provide the one or more steps through a visual interaction with the user of the communications device; and transmitting, to the communications device, the third instructions.

* * * * *